United States Patent
Lewit et al.

(10) Patent No.: US 11,313,124 B2
(45) Date of Patent: Apr. 26, 2022

(54) COMPOSITE STRUCTURE JOINING SYSTEM AND METHOD AND RELATED STRUCTURES

(71) Applicant: COMPOSITES INTELLECTUAL HOLDINGS, INC., West Melbourne, FL (US)

(72) Inventors: Scott Lewit, Melbourne, FL (US); Ronnal P. Reichard, Melbourne, FL (US)

(73) Assignee: COMPOSITES INTELLECTUAL HOLDINGS, INC., West Melbourne, FL (US)

( * ) Notice: Subject to any disclaimer, the term of this patent is extended or adjusted under 35 U.S.C. 154(b) by 0 days.

(21) Appl. No.: 15/745,606

(22) PCT Filed: Jul. 23, 2016

(86) PCT No.: PCT/US2016/043779
§ 371 (c)(1),
(2) Date: Jan. 17, 2018

(87) PCT Pub. No.: WO2017/015647
PCT Pub. Date: Jan. 26, 2017

(65) Prior Publication Data
US 2018/0209146 A1    Jul. 26, 2018

Related U.S. Application Data

(60) Provisional application No. 62/195,948, filed on Jul. 23, 2015.

(51) Int. Cl.
*E04B 2/00* (2006.01)
*E04C 2/40* (2006.01)
(Continued)

(52) U.S. Cl.
CPC .......... *E04C 2/46* (2013.01); *B32B 3/06* (2013.01); *B32B 5/18* (2013.01); *B32B 27/12* (2013.01);
(Continued)

(58) Field of Classification Search
CPC ... E04C 2/46; E04C 2/40; E04C 2/246; E04C 2/243; E04C 2002/004; E04C 2/02;
(Continued)

(56) References Cited

U.S. PATENT DOCUMENTS 2,858,582 A * 11/1958 Toulmin, Jr. ............ E04C 2/246
403/364
3,832,263 A *  8/1974 Cleveland et al. ....... B32B 3/18
428/57
(Continued)

FOREIGN PATENT DOCUMENTS

DE    3517930 A1 * 11/1986 ............... E04B 1/62
FR    999527 A  *  2/1952 ............. E04C 2/243

*Primary Examiner* — Christine T Cajilig
(74) *Attorney, Agent, or Firm* — Lowndes; Stephen C. Thomas

(57) ABSTRACT

A composite structure joining system and method comprises a structural panel, preferably but not necessarily fabricated from structural composite materials, that further comprises a nesting C-joint feature that facilitates assembly of a plurality of panels of the invention to form a planar structure such as a wall. An embodiment of the present invention comprises a plurality of the panels of the invention, joined together using the C joint of the invention, captured in a frame. The frame structural elements may comprise metals such as aluminum or steel, or may be hand laid or extruded fiberglass as described in more detail below. The invention further comprises methods of manufacturing a plurality of structural panels of the invention. The method of the invention may be used to fabricate intermodal shipping containers (Continued)

that have superior structural and thermal characteristics, are lightweight, resulting in lower transportation costs and lower container costs.

20 Claims, 12 Drawing Sheets

(51) Int. Cl.
    *E04C 2/24*     (2006.01)
    *B32B 3/06*     (2006.01)
    *B32B 5/18*     (2006.01)
    *B32B 27/12*     (2006.01)
    *B32B 27/40*     (2006.01)
    *B65D 90/08*     (2006.01)
    *E04C 2/02*     (2006.01)
    *E04C 2/00*     (2006.01)
    *B29C 70/48*     (2006.01)
    *B29K 75/00*     (2006.01)
    *B29K 105/04*     (2006.01)
    *B29L 31/00*     (2006.01)

(52) U.S. Cl.
    CPC .............. *B32B 27/40* (2013.01); *B65D 90/08* (2013.01); *E04C 2/02* (2013.01); *E04C 2/243* (2013.01); *E04C 2/246* (2013.01); *E04C 2/40* (2013.01); *B29C 70/48* (2013.01); *B29K 2075/00* (2013.01); *B29K 2105/04* (2013.01); *B29L 2031/776* (2013.01); *B32B 2255/02* (2013.01); *B32B 2255/26* (2013.01); *B32B 2260/021* (2013.01); *B32B 2260/046* (2013.01); *B32B 2266/0278* (2013.01); *B32B 2607/00* (2013.01); *E04C 2002/004* (2013.01)

(58) Field of Classification Search
    CPC .. E04C 2/205; B32B 3/18; B32B 3/06; B32B 5/18; B32B 27/12; B32B 27/40; B65D 90/08

See application file for complete search history.

(56) References Cited

U.S. PATENT DOCUMENTS

| | | | | |
|---|---|---|---|---|
| 4,411,939 | A * | 10/1983 | Hawkins | E04C 2/24 428/58 |
| 5,888,329 | A * | 3/1999 | Cho | B32B 5/24 156/93 |
| 5,904,972 | A * | 5/1999 | Tunis, III | B29C 70/865 428/178 |
| 8,419,883 | B2 * | 4/2013 | Day | B29C 44/1285 156/264 |
| 9,346,193 | B2 * | 5/2016 | Stege | B29C 33/301 |
| 2008/0127600 | A1 * | 6/2008 | Schiffmann | E04C 2/243 52/741.1 |
| 2009/0308001 | A1 * | 12/2009 | Wu | E04C 2/326 52/173.3 |
| 2014/0260052 | A1 * | 9/2014 | Lee | B32B 3/06 52/578 |
| 2014/0262011 | A1 * | 9/2014 | Lewit | B29B 15/10 156/275.5 |

\* cited by examiner

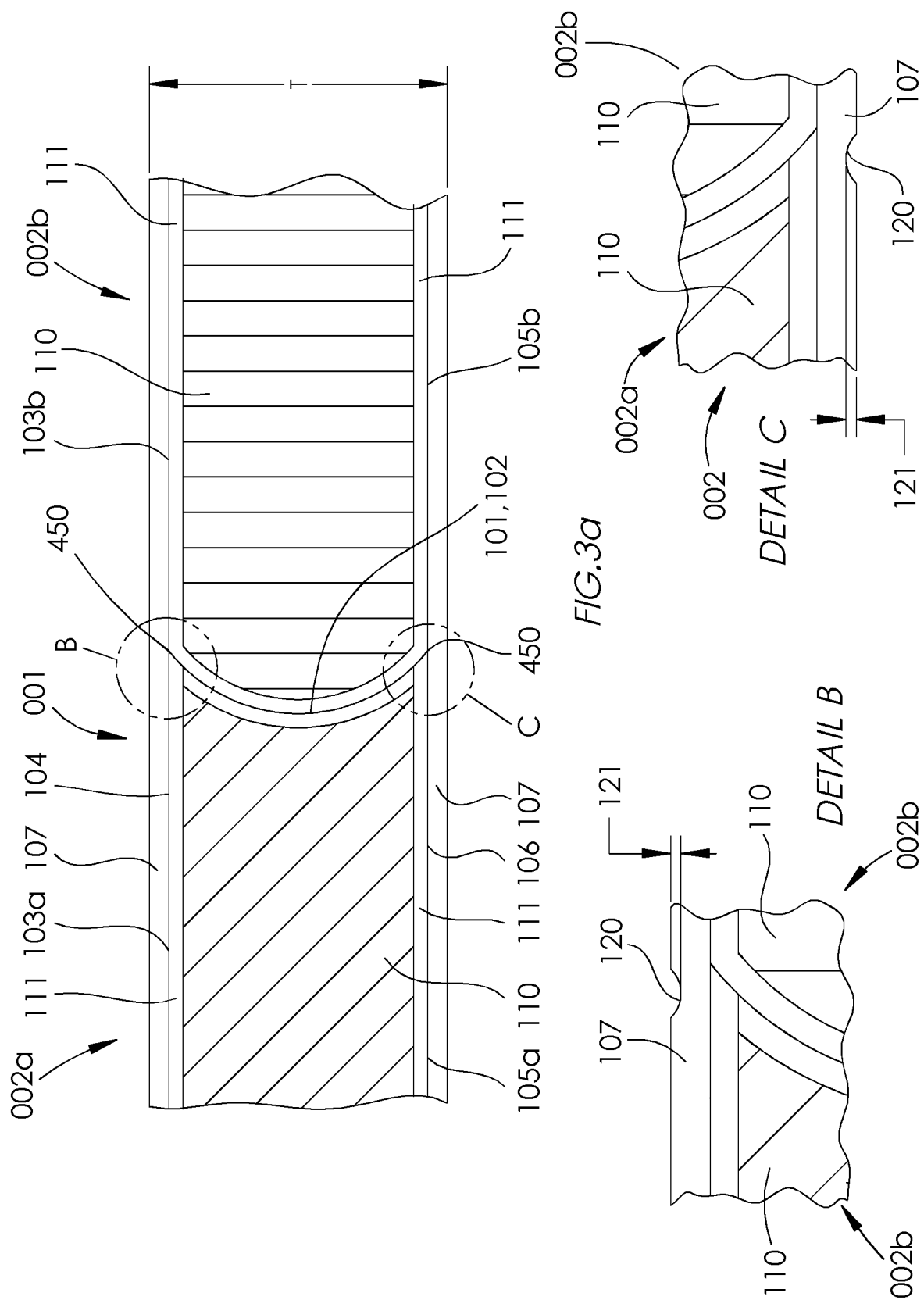

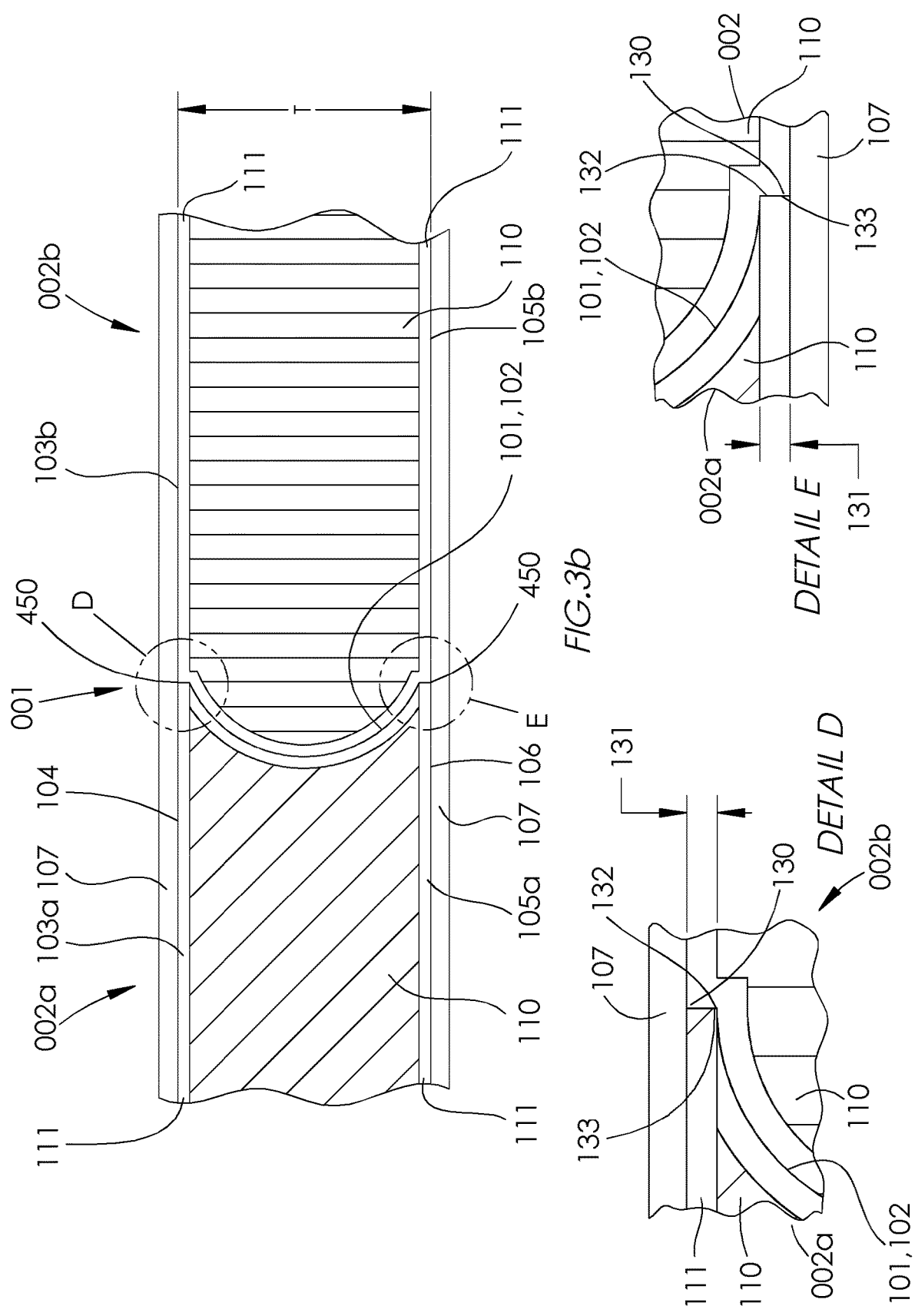

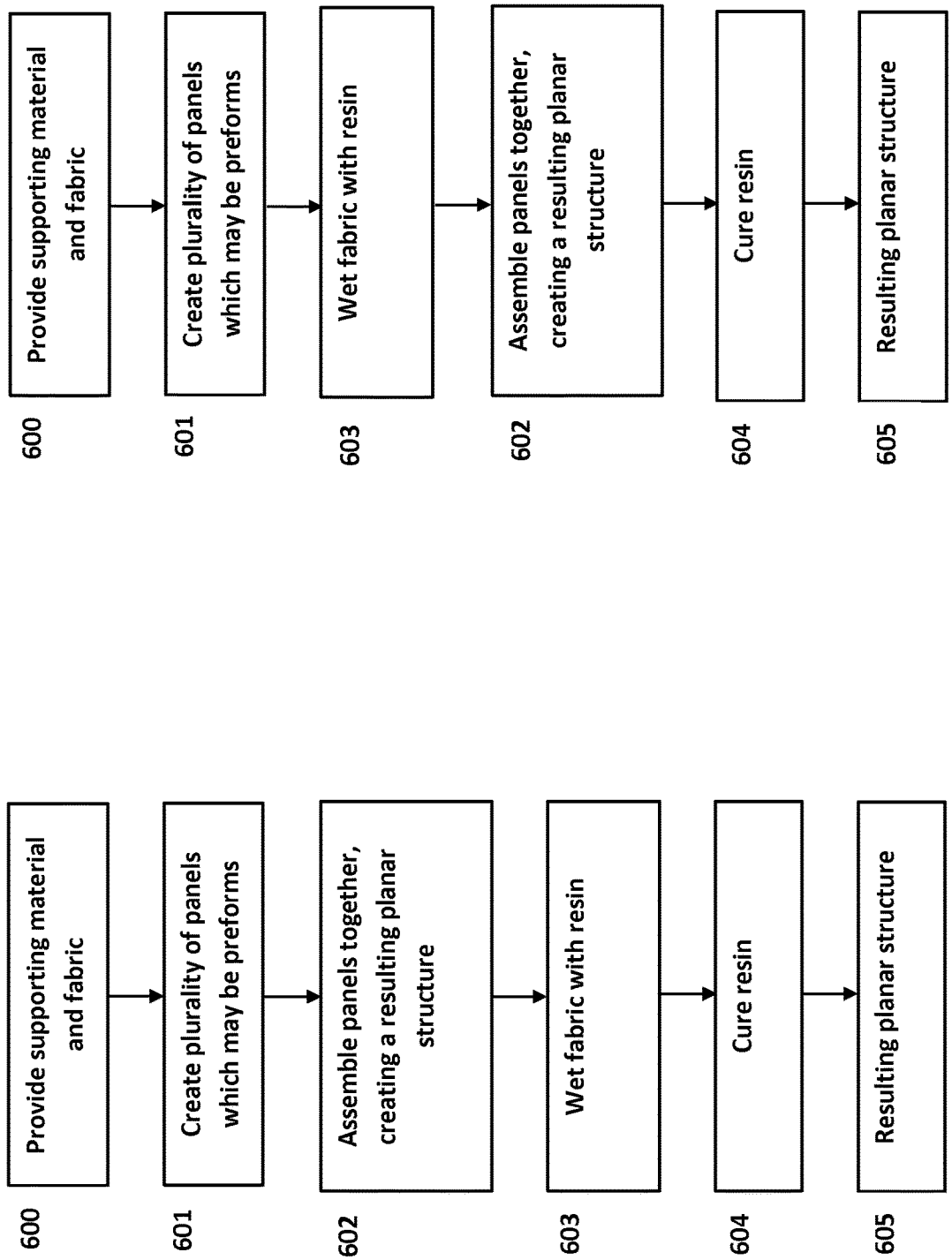

COMPOSITE STRUCTURE JOINING SYSTEM AND METHOD AND RELATED STRUCTURES

CROSS REFERENCE TO RELATED APPLICATIONS AND INCORPORATION BY REFERENCE

This patent application claims benefit of priority to United States provisional patent application Ser. No. 62/195,948 titled COMPOSITE STRUCTURE JOINING SYSTEM AND METHOD AND RELATED STRUCTURES filed in the United States Patent and Trademark Office (USPTO) on Jul. 23, 2015, which is incorporated herein its entirety by reference.

This patent application also incorporates by reference in their entirety each of the following patents and printed patent publications: U.S. Pat. No. 9,371,468, titled CO-CURED GEL COATS, ELASTOMERIC COATINGS, STRUCTURAL LAYERS, AND IN-MOLD PROCESSES FOR THEIR USE, which issued from the USPTO on Jun. 21, 2016; United States printed patent publication number US2014-0262011 A1, titled STRUCTURAL COMPOSITE PREFORM WET-OUT AND CURING SYSTEM AND METHOD, published by the USPTO on Sep. 18, 2014; U.S. Pat. No. 6,543,469, titled SYSTEM FOR CONTINUOUSLY MANUFACTURING A COMPOSITE PREFORM to Lewit et al., ("the '469 patent"), which issued from the USPTO on Apr. 8, 2003; U.S. Pat. No. 5,897,818, METHOD FOR CONTINUOUSLY MANUFACTURING A COMPOSITE PREFORM to Lewit et al., which issued from the USPTO on Apr. 27, 1999; U.S. Pat. No. 6,013,213 titled METHOD FOR MAKING DEFORMABLE COMPOSITE STRUCTURES AND ASSEMBLING COMPOSITE ARTICLE, which issued from the USPTO on Jan. 11, 2000; U.S. Pat. No. 5,429,066 titled COMPOSITE STRUCTURES AND METHOD OF MAKING COMPOSITE STRUCTURES, which issued from the USPTO on Jul. 4, 1995; and U.S. Pat. No. 5,908,591 titled METHOD FOR MAKING COMPOSITE STRUCTURES, which issued from the USPTO on Jun. 1, 1999.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to composite structure manufacture and assembly of structures that may be used, for example, in applications such as refrigerated box structures as may be used for transport of refrigerated goods. Refrigerated box structures may be utilized in over the road trucking or rail shipping and are but one example of the many applications that derive benefit from the present invention. The composite structure and method of fabrication of the invention is also useful for building wall panel construction in the building construction trades, enclosure structure construction and other structural applications. The composite structure joining system and method of the invention provides significant improvements over the state of the art by enabling the joining of panel structures, which may, but do not necessarily, comprise structural composite materials, that are able to withstand greater impact than assembled panel structures of the previous art, are easier to assemble and may result in faster production run rates, are significantly more thermally efficient than structures of the prior art, and result in longer life, lower maintenance costs, and overall lower cost of operation over time than assembled panel structures of the prior art.

2. Background of the Invention

Structures that comprise an assembly of panels, such as walls, have numerous and varied applications in a number of industries. For example, buildings, shipping containers, retaining walls, and numerous other structures may be designed and fabricated based upon the use of panels in their construction. Such panels may have certain desired structural, thermal, weight, electrical insulation, corrosion resistance or other desired physical or chemical characteristics that are may determine the size and configuration of the panel, and may (and often does) determine the selection of material used to fabricate the panel. Typically, depending upon the application, panels may be pre-fabricated and formed into a desired shape such as in the case of a shipping container or in certain construction projects; or, in the alternative, panels may be fabricated in situ if desired in certain construction projects or other structural applications.

As a specific example, containers for use in intermodal shipping are typically rectangular in shape and are constructed of metal, typically steel, and are fabricated by welding or other mechanical assembly means known in the art. Such metal containers, when used in refrigerated shipping applications, require additional thermal insulation and may never in fact be well insulated due to the selection of materials typically used to fabricate them. The result may be that increased means of active cooling may be required in such applications. Such means may include water cooling systems as may be used on ships, or additional refrigeration units powered by diesel generators used in over the road trucking applications. However, the use of additional refrigeration may result in lower reliability, higher fuel and equipment costs, and overall higher cost to ship refrigerated products.

One reason for the use of metals, and specifically steel, in intermodal shipping container construction is that shipping containers may be subjected to various steady state or impact loads such as fork lift impact or dropping of the container, all while carrying heavy cargo inside. For this reason shipping containers are expected to be subjected to years of such loading without failure. Thus, steel is a reasonable choice from a structural point of view, but is heavy and is a poor thermal insulator.

Furthermore, transportation costs are generally directed related to fuel usage, which is in turn directly related to the weight of the product being shipped. It is therefore desirable that weight of an intermodal shipping container be kept as low as reasonably possible.

What is needed in the art of structure fabrication, then, is an impact resistant and load-capable structure comprised of materials and construction details that afford light weight and increased thermal insulation properties that may be readily constructed in quantity so that manufacturing costs are kept low.

BRIEF SUMMARY OF THE INVENTION

The present invention comprises a system and/or method that have one or more of the following features and/or steps, which alone or in any combination may comprise patentable subject matter.

The system and method of the invention described in detail below comprises a structurally robust, mass producible, structural composite preform panel that further comprises features that enable accurate assembly, and of which a plurality may be assembled together to form a planar or other formed structural surface such as a wall, which may then be used to constructive a thermally insulative, structurally robust composite structure. The panels of the invention may be mass produced so that economies of scale are realized. The composite structure of the invention is also corrosion resistant and light weight.

In accordance with one embodiment of the present invention, the composite structure joining system and method of the invention comprises a structural panel, preferably, but not necessarily, fabricated from structural composite materials, that further comprises a C-joint feature disposed on one or more of the panel side end faces that facilitates assembly of a plurality of panels of the invention to form a composite structure such as a wall. The structural panel of the invention may be fabricated by any means known in the art, but specifically may be preferably fabricated by use of the PRIZMA® method of fabricating composite structures as described further below. An additional embodiment of the present invention comprises a plurality of the panels of the invention, joined together using for example the C-joint of the invention described below in more detail, captured in a frame that may comprise structural elements with a generally C-shaped cross-section wherein the frame surrounds the plurality of assembled panels on at least one side but, preferably, in a rectangular panel configuration on all four sides. The frame structural elements may comprise metals such as aluminum or steel, or may be hand laid or extruded fiberglass as described in more detail below. The invention further comprises a method of assembly of a plurality of structural panels of the invention. The method of the invention may be used to fabricate, for example and not by way of limitation, a wall or other flat structural element comprised of a plurality of structural panels of the invention, such as may be used to further fabricate an enclosed box structure that may be utilized, for example, to create intermodal shipping containers that have superior structural and thermal characteristics, are lightweight, and able to be produced in quantities such that economies of scale may be realized, resulting in lower transportation costs and lower container costs.

In an embodiment, the invention comprises a nested C joint between two adjoining panels. The nested C joint between adjoining panels is forms from a first panel having a first edge, a first planar surface, and a second planar surface, said first edge comprising a concave arcuate surface; and a second panel having a second edge, a third planar surface, and a fourth planar surface, said second edge comprising a convex arcuate surface. The concave arcuate surface and said convex arcuate surface are complementary, and the concave arcuate surface is adapted to receive the convex arcuate surface such that when the first edge of the first panel and the second edge of the second panel are brought together, the concave arcuate surface and the convex arcuate surface together form a nested joint between the first and second panels, and the first planar surface and said third planar surface together form a resulting fifth planar surface, and the second planar surface and the fourth planar surface together form a resulting sixth planar surface.

In a further embodiment, the invention comprises a panel, which may be used, for example, as a panel or wall structure, which may have any outline shape desired, such as rectangular, square. The panel of the invention comprises a first planar surface, a second planar surface, a first edge comprising a C-joint having a concave arcuate shape, and a second edge comprising a C-joint having a convex arcuate shape, wherein the convex arcuate shape and concave arcuate shape are complementary and are adapted to be received by the edge of an adjoining panel of the invention having a complementary arcuate shape, forming a nested joint between the adjoining panels. In further embodiments, the panels of the invention may have other edges that may be adapted to nest with or attach to features in adjoining structures such as panels or other structural members. Such other adjoining structures may be, for example, and not by way of limitation, panels or other structural members that may form part walls or part of a top surface or bottom surface of an enclosure. Thus, the panels of the invention may be used to form, for example, an enclosure. Such an enclosure may be, for example, an enclosure to be used for a refrigerated box for shipping refrigerated goods by truck, rail or other transport system. However, it is understood that composite structures comprising a C-joint of the invention are applicable and adaptable to any structural application such as flooring, sound barriers, roofs structures or any other application requiring a planar structure.

In still a further embodiment, the invention comprises a planar structure formed of a plurality of adjoining panels, wherein each panel comprises a first planar surface, a second planar surface, a first edge, and a second edge, each of said first planar surface, second planar surface, said first edge and said second edge covered with a layer of fabric; wherein the first edge of each of the plurality of panels is defined as comprising a concave arcuate surface; and wherein the second edge of each of the plurality of panels is defined as comprising a convex arcuate surface; and wherein the concave arcuate surfaces are complementary to the convex arcuate surfaces and wherein the concave arcuate surface is adapted to receive the convex arcuate surface of an adjoining panel when the first edge of the first panel and the second edge of the second panel are brought together, forming a nested joint between adjoining panels. Each panel of the plurality of panels is attached to an adjoining panel by a nested joint. The plurality of panels has a resulting third planar surface formed by the first planar surfaces of each of the plurality of panels, and also has a resulting fourth planar surface formed by the second planar surfaces of each of the plurality of panels. Each of the layers of fabric is saturated with a resin that is subsequently cured.

In still a further embodiment, the invention comprises a method of fabricating a planar structure, comprising the steps of 1) providing a plurality of panels, each panel comprising foam covered by fabric, wherein each panel of said plurality of panels comprises a first planar surface, a second planar surface, a first edge, and a second edge, each of said first planar surface, second planar surface, said first edge and said second edge covered with at least one layer of fabric; wherein said first edge of each panel of said plurality of panels is defined as comprising a concave arcuate surface in cross section; and wherein said second edge of each panel of said plurality of panels is defined as comprising a convex arcuate surface in cross section; 2) assembling plurality of panels together forming a resulting planar structure comprised of adjoining panels joined together at a nested joint in which the convex arcuate surface of one panel of said plurality of panels is nested into the concave arcuate surface of an adjoining panel of said plurality of panels, said resulting planar structure having a resulting first planar surface and a resulting second planar surface; 3) saturating each of said layers of fabric with a resin; and 4) curing said resin.

The structural panels of the invention comprising a C-joint may be irregularly shaped or multi-sided panels, and the C-joint feature of the invention may be used in any surface thereof, including but not limited to planar panel surfaces and end face surfaces. In other words, it is not necessary that the invention comprise only four sided, planar structures.

The shape and dimensions of the invention are adaptable to many applications. Furthermore, the arcuate surface shape is referred to herein as a "C" shape, however in is within the scope of the invention that the arcuate surface shape may be any shape desired, the shape being determined by desired structural and thermal properties of the assembled composite structure. For example, a deeper elongated C shape will provide a different structural response than a shallower C shape, with less resistance to deforming transversely, but will tend to extend the supporting effect over a longer area of the panel. The specific shape of the joint may thus be optimized for a given loading conditions. Thinner panels would benefit from more frequent joints while thicker panels can have the joints spaced over a greater panel span. The response of the panel is also impacted by the laminate schedule. The fiber type, fiber orientation and number of plies in the joint section along with the laminate in the panel section and the surrounding foam properties each can be used to optimize the shape and dimensions of the resulting composite structure to achieve a desired thermal characteristic, mechanical characteristic, weight or cost, or any combination of these.

An example of the industrial applicability of the invention is the case of a fork lift operating inside the box of a refrigerated trailer. Fork lift operators often use the wall as a guide to make sure the load is as close to a side wall as possible. The result is that the forklift wheel, and, at times, the cargo, impact the wall and the slide along the wall of the trailer. Conventional shear ties with thin skinned laminates tend to have shear tie failure and or laminate skin failure at or near the shear tie in such situations. The large increase in transverse stiffness occurs on the wall panel suddenly as the deflection decreases nears the rigid shear tie, imposing high stress concentration on the shear tie and locally on the skin. This is a drawback of the prior art. In contrast the nested C joint of the invention acts as an internal spring in the wall, transferring the load of the impact along the arcuate surfaces of the nested joints between panels, allowing the wall skin to deflect with a more gradual transition and flexible shear tie that prevents structural failure or other damage to the wall and shear tie.

The mechanical and thermal properties of the nested C joint of the invention may be tailored as desired for a specific application by selecting the fabric fibers, plies and orientations. In the same example of a refrigerated trailer, a fabric fiber orientation of +45-45 E-Glass fabric would likely be the preferred embodiment from a cost and performance perspective. Additional fibers in the 90° orientation can be added and or additional plies can be added to provide additional resistance and load bearing.

The selection of fabric/resin laminate and supporting material, such as foam, have a large impact on the overall wall performance. Higher density foams will provide more resistance and support thinner wall skins; however, they will tend to add weight and degrade thermal performance. Foam densities in the 2.2-2.4 pounds per cubic feet range have been found to be the optimal for low cost polyurethane foams. Some of these low density polyurethane foams provide excellent insulation characteristics, are lightweight and can withstand large deformations without failures.

C joint spacing between panels, which may be determined by panel width, is another parameter that can be used to optimize properties. Increasing the number of C joints makes each panel more resistant to flexural loads and in-plane loads. Also distance between C joints does not need to be even, i.e., a resulting planar structure may comprise panels of differing widths. For example, in a refrigerated trailer, a higher number of C joints may be used at the rear end and front ends of the trailer box, where expected loads may be higher. Thus, a larger number of C joints toward the rear of the trailer box would help mitigate global loading as a fork lift enters and exits the trailer. In the front end of the trailer, a larger number of C joints, i.e. more frequent spacing between panels, assists in mitigating shock loads as the trailer coupler impacts the tractor, or when the tractor decouples allowing the trailer to drop on the front support legs. In the same manner as above, in such applications the particular shape and laminate schedule of each joint can be optimized as needed, depending upon expected load conditions.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 3a depicts a cross sectional view of two foam panels of the invention fitted together, depicting the C joint of the invention in cross-section and providing further details of the C joint of the invention into breakout detail views, in which an arcuate convex surface of an edge of a first panel is received by an arcuate concave surface of an edge of a second panel, forming a nested joint between the complementary concave and convex arcuate surfaces on the first edge of the first panel of the invention and a second edge of the second panel of the invention; also shown is the advantage of the present invention in reducing or eliminating print through depressions.

FIG. 3b depicts a cross sectional view of two panels of an alternate embodiment of the invention fitted together, depicting the C joint of the invention in cross-section and providing further details of the C joint of the invention into breakout detail views, in which an arcuate convex surface of an edge of a first structural composite panel is joined to an arcuate concave surface of an edge of a second structural composite panel, and wherein convex surface step surfaces are joined to concave surface step surfaces, forming a nested joint between the complimentary concave and convex arcuate surfaces on the first edge of a first panel of the invention and a second edge of a second panel of the invention.

FIGS. 9a and 9b depict flow charts describing methods of manufacture of planar structures of the invention.

DETAILED DESCRIPTION OF THE INVENTION

Figure 1A:
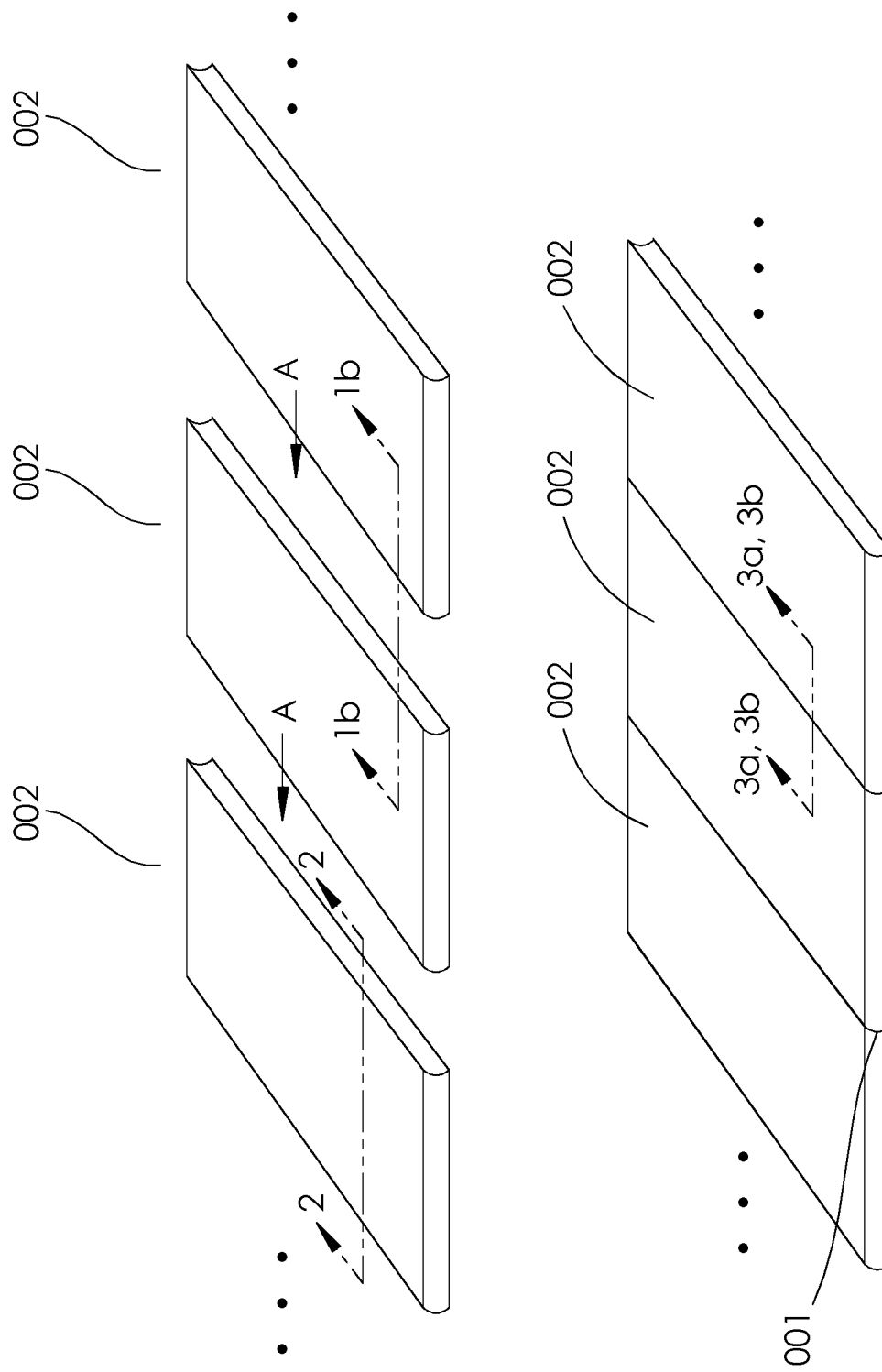
FIG. 1a depicts panels of the invention comprising the C joint of the invention, showing the panels coming together to form an exemplary planar structure.

The following documentation provides a detailed description of the invention, and the accompanying figures depict exemplary embodiments of the invention.

It is an object of the system and method of the invention to provide an improved C joint for joining panels together, said C joint providing superior thermal performance by reducing the overall thermal conductivity from one planar surface of the assembled planar structure of the invention to an opposing planar surface; and providing superior structural performance by providing increased load bearing ability, durability and ability for the assembled panel to return to its original shape after being impacted by a force, due to the novel geometry of the C joint.

It is a further object of the invention to provide a panel configured to be used in the assembly of a planar structure comprising the advantageous C joint of the invention.

It is a further object of the invention to provide a planar structure comprised of panels that are assembled together using the nesting C joint of the invention. Such planar structures may be used, for example, as wall structures. The panels may comprise foam overlaid with fabric that is saturated with resin that is subsequently cured. In an embodiment, the assembled planar structure is captured within a frame that may have a U-shaped cross section, and into which surfaces of the assembled wall panels may be inserted and chemically bonded.

It is further an object of the invention to provide a manufacturing method for producing the panels of the invention comprising the novel nested C joint of the invention.

It is a further object of the invention to describe and claim an assembled multisided structure comprising foam panels of the invention which further comprise C joints of the invention and being assembled together using the nested C joints of the invention, substructure being usable, for example, in thermally insulated intermodal shipping containers such as may be used in refrigerated shipping applications such as over the road trucking, rail, shipboard transportation and the like.

As used herein, "un-wetted" includes any composite structure or fabric that has not been impregnated or coated with resin. "Wetted" means a fabric has been impregnated or coated with resin. "Wet-out" means the process for applying, by impregnating, coating or likewise, a resin to a fabric. In a fully wetted, or fully impregnated, fabric all or nearly all of the fiber filaments are thoroughly saturated with the resin or resin mixture. "Wetting" means to apply resin to a fabric such that it the fabric is fully wetted.

As used herein, "composite structure" includes a structure that comprises fabric intended to be impregnated, i.e. wetted, with resin, typically but not necessarily surrounding a supporting material, which may be but is not necessarily, foam.

As used herein "resin" includes any matrix or other material that is used to coat the fiber layers of a fiber-reinforced composite structure or preform. Resins may be natural or synthetic. Such resins include but are not limited to polymers (orthophthalic, isophthalic or otherwise), polyester resins, vinyl ester resins, epoxy resins, phenolic and any other resin known in the art of composite structure manufacture. As used herein, "resins" also includes any resign that is cured or polymerized by application of light (regardless of wavelength), heat, electron beam cure that may utilize, for example, high energy electrons or X rays as ionizing radiation, or any other type of cure. Light cure, as used herein, also means "light-activated", and includes all light curable resins including but not limited to one-part translucent polymers that cure when exposed to a specific light spectrum. When the word "light" is used herein, it refers to light energy of an optical spectrum that is matched to the light curable resin it is being used to cure. "Cure on demand" resins mean any resin that does not self-cure: typically cure on demand resins are cured by application of some external energy such as heat, light, ionizing radiation or any other energy source.

As used herein, "co-cure" or "co-cured" means resins that are co-cured with, for example, gel coat, as described in U.S. Pat. No. 9,371,468, meaning, generally, that the reactions involved in producing a urethane polymer (i.e., reaction of a polyisocyanate or NCO-terminated prepolymer with polyols and hydroxy or amine-functional extenders) take place essentially concurrently with reactions involved in converting vinyl ester epoxy, or unsaturated polyester reactants to cured products. Unsaturated polyester and vinyl ester resins generally react with styrene and free-radical initiators to produce a cured thermoset polyester or vinyl ester. Epoxy resins generally react with "hardeners" or curing agents to produce a cured epoxy component. The co-cured product comprising the urethane and polyester, epoxy, or vinyl ester components is distinguishable from an interpenetrating network (IPN) because there can be some reactions involving chains of each network. The meaning of "co-cure" includes all the teachings of U.S. Pat. No. 9,371,468.

As used herein, "Fabric" includes any fibrous material known in the art of composite structure manufacture, either matt, woven, non-woven, chopped or otherwise, and may comprise fiberglass, carbon fiber, glass fibers, cellulose, polymers, for instance aramid, pararamid and the like. Fabric may be backed or unbacked.

As used herein, "Fabric layer" includes a single or plurality of fabric layers, of any type of fabric in any combination. For instance, "fabric layer" may mean one layer of woven fabric, or may mean a layer of woven fabric in conjunction with a layer of non-woven fabric. The system and method of the invention applies to any selection of fabric materials and the number of layers as chosen by the user. Fabric layers need not be continuous, in other words, fabric layers may be pieced together using separate pieces of fabric to comprise a completed layer.

As used herein, "Foam" includes any foam material used in the art of composite structure manufacture, and includes, for example and not by way of limitation, polyurethane foam such as a self-expanding self-curing foam. Typically, for example, such a self-rising, self-curing foam is a urethane foam commercially available from BASF, MOBAY, or PPG, and is typically an MDI-based rigid polyurethane foam (methylene-diphenyl-methane diisocyanate or methylene diphenyl diisocyanate) using hydrogenated chlorofluorocarbons (HCFe), water and/or CO2 as a blowing agent.

As used herein, "hybrid resin" includes any blend of resins, including but not limited to polyesters, vinyl esters, polyurethanes or epoxies, in any combination or ratios. The blend of these materials may be tailored to achieve an optimal set of properties for a given application.

As used herein, "planar" includes flat planar surfaces and curved planar surfaces.

As used herein, "preform" means a structure comprising a supporting material at least partially covered with a fabric that has been formed to a desired shape.

As used herein, "supporting material" means a material that supports laminated structures comprising fabric impregnated with resin that is subsequently cured. Foam is a non-limiting example of a supporting material.

"Joint" and "C joint" are used interchangeably.

The system and method of the invention includes within its scope all types of resins, fabrics, supporting materials, and combinations thereof, and in fact that this is a distinct advantage of the present invention over the prior art.

The C Joint of the Invention

Referring now to FIG. 1a, panels 002 of the invention comprising the C joint 001 of the invention, showing the panels coming together to form an exemplary planar structure are depicted.

Figure 1B:
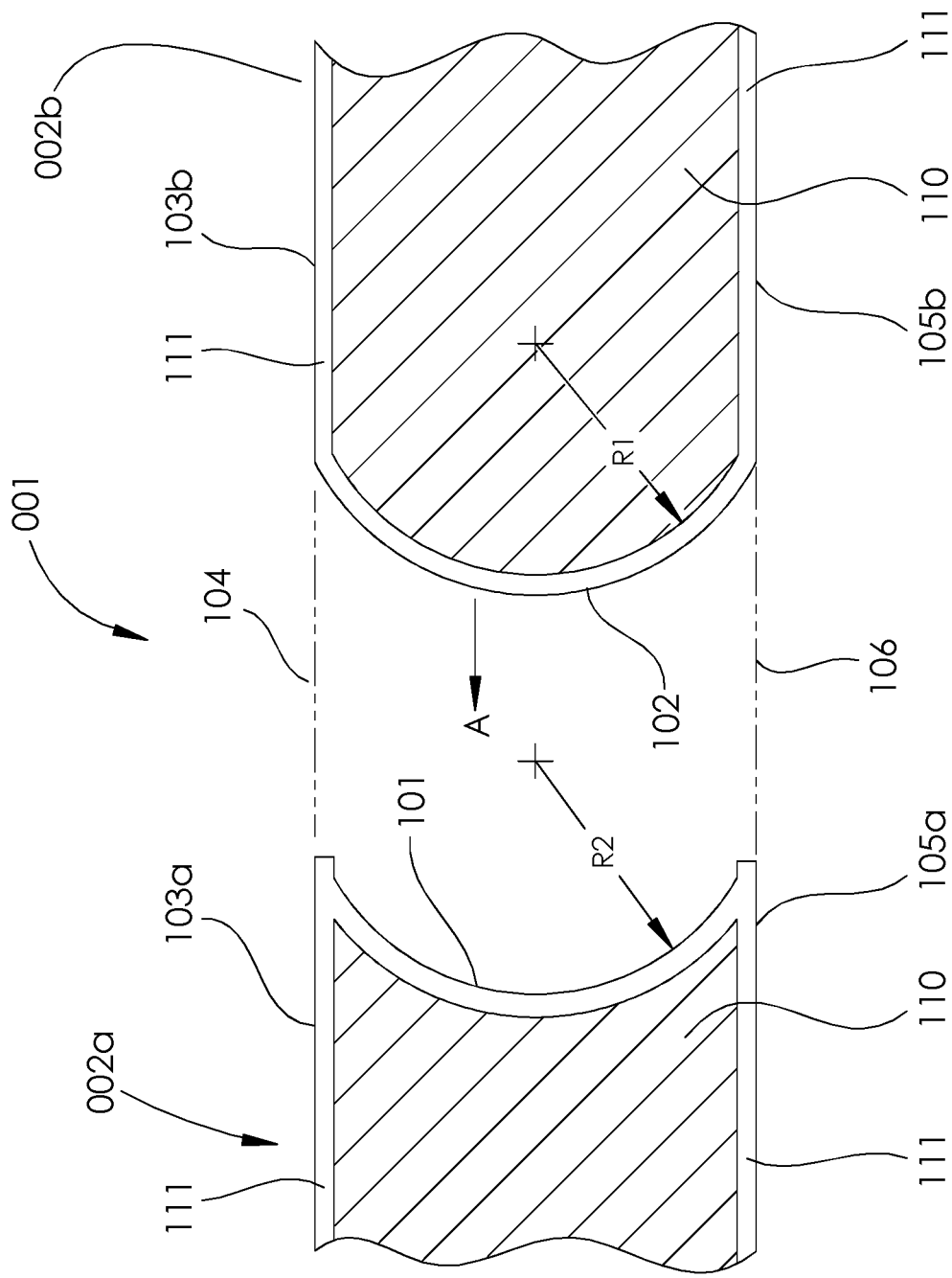
FIG. 1b depicts a cross-section of an embodiment of the C joint of the invention, showing in detail an embodiment of an arcuate concave surface disposed on a first edge of a first panel, an embodiment of an arcuate convex surface disposed on a second edge of the second panel, depicting features of an embodiment of the nesting of the C joint of the invention and further showing the fabric layers.

Referring now to FIG. 1b, the details of a typical C joint of the invention 001 are shown. a cross-section of an embodiment of panels of the invention, showing in detail an embodiment of an arcuate concave surface 101 disposed on a first edge of a first panel 002a, an embodiment of an arcuate convex surface 102 disposed on a second edge of a second panel 002b, showing features of an embodiment of the C joint of the invention are depicted. Two panels of the invention 002a and 002b may be assembled together using the C joint of the invention as depicted in FIG. 1b. Each of the panels 002a and 002b may comprise an edge having complementary nesting arcuate surfaces 101 and 102 so that the panels 002a and 002b may be assembled together forming a nested joint between them. Arcuate surfaces 101 and 102 may be any arcuate shape desired. In a specific, non-limiting embodiment, arcuate surfaces 101 and 102 may be defined by a radius R1. When the panels are brought together by motivating them in the direction of arrow A, the complementary arcuate surfaces 101 and 102 of panels 002a and 002b nest together to form a completed C joint of the invention as is further depicted in FIG. 3A. Panel 002a may further comprise a first planar surface 103a and a second planar surface 105a, and panel 002b may comprise a third planar surface 103a and a fourth planar surface 105b. Thus, when two panels of the invention 002a and 002b are motivated together to form a nested C joint, a planar structure, which may be used, for example, as a wall structure, comprising a contiguous fifth planar surface 104 and sixth planar surface 106 is formed. Panels of the invention 002 may comprise any supporting material 110 known in the art, such as for example foam. Furthermore, in an alternate embodiment, panels of invention 002 may comprise supporting material 110 that has been covered with a fabric 111 which is saturated with resin which is then cured by any curing means known in the art. In the case where panels of the invention 002 comprise foam material that has been covered with a fabric 111 saturated with resin, injection or infusion molding, or the manufacturing technique known as vacuum bagging, may be employed to wet and cure the resin saturating the fabric of panels 002 as is further explained below.

Still referring to FIG. 1b, radius R1 and radius R2 are selected such that when arcuate concave surface 101 and arcuate convex surface 102 are brought together, they form a completed nested joint with substantially constant contact between complimentary surfaces 101 and 102. In the specific non-limiting case in which arcuate concave surface 101 and arcuate convex surface 102 are defined as a portion of an arc of a circle, radius R1 and radius R2 define the radius of the circle and arcuate concave surface 101 and arcuate convex surface 102 in this embodiment are therefore defined as forming a portion of a circle when viewed in cross-section as shown in FIG. 1b. However, it is not necessary that arcuate concave surface 101 and convex surface 102 comprise a geometry that is a portion of an arc of a circle. Concave surface 101 and convex surface 102 may be any arcuate or curvilinear surface that are complementary and form substantially constant contact between services 101 and 102 when assembled together to form a nested C joint. Such shapes include compound arcuate surfaces. Thus, for example, arcuate concave surface 101 and convex surface 102 may be elliptical, compound, or any other complementary shapes. In the case in which arcuate concave surface 101 and convex surface 102 are not defined as part of an arc of a circle, radius R1 and radius R2 are not utilized as the radius of a circle to define concave surface 101 and convex surface 102.

Figure 2:
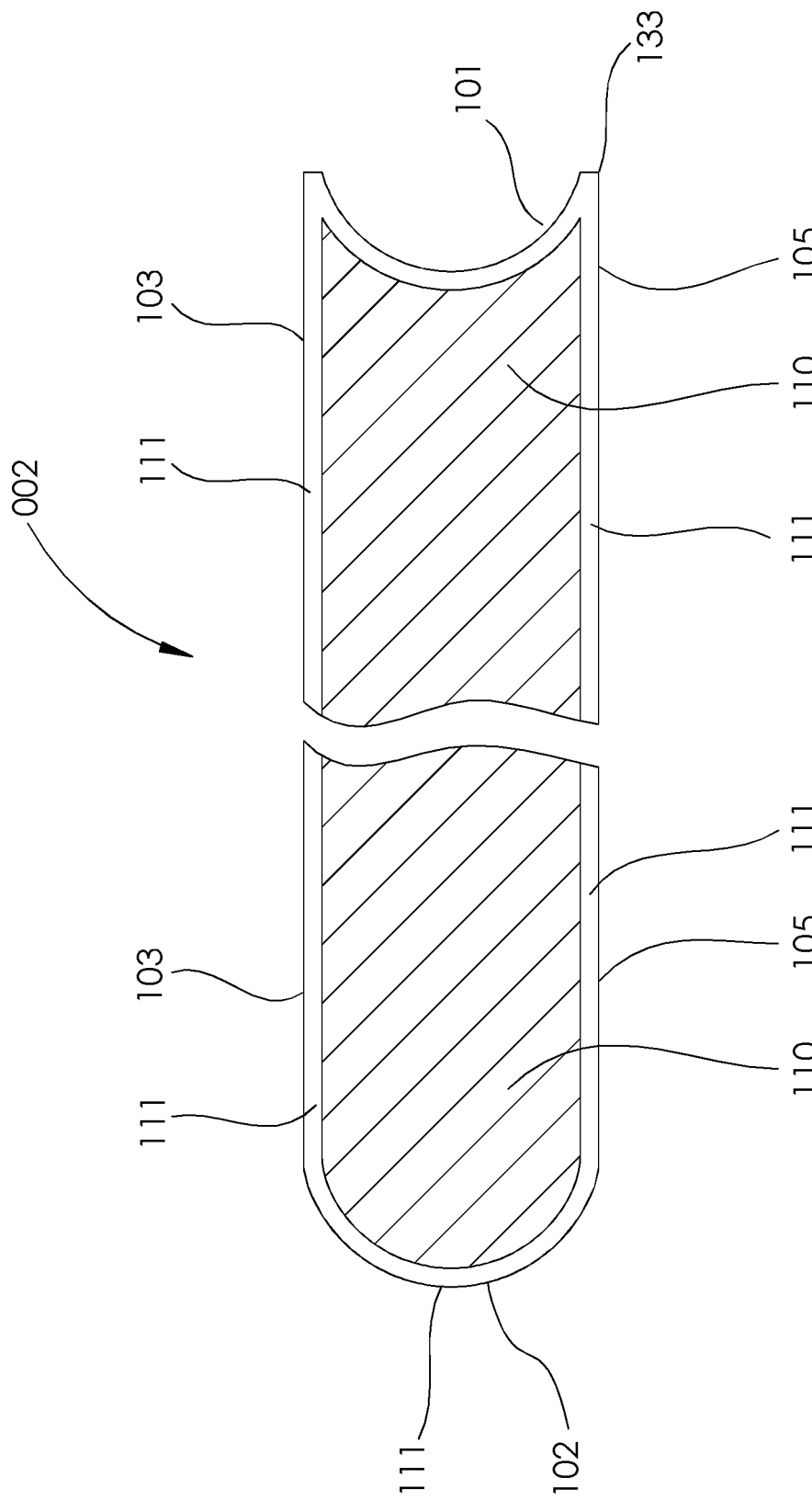
FIG. 2 depicts a cross-section of an embodiment of a panel of the invention, showing the arcuate concave surface disposed on a first edge of a panel and an arcuate convex surface disposed on a second edge of a panel of the invention and further showing the fabric layer of the structural panel.

Referring now to FIG. 2, a cross-section of an embodiment of a foam panel of the invention, showing in detail an arcuate concave surface 101 disposed on a first edge of a panel 002 and an arcuate convex surface 102 disposed on a second edge of the panel of the invention 002, is depicted. Panels of the invention 002 may comprise edges having complementary arcuate surfaces so that the panels 002 may be assembled together as further depicted in FIG. 3a and described elsewhere herein to form a planar structure. A first edge of a panel 002 may comprise a concave arcuate surface 101. A second edge of a panel 002 may comprise a convex arcuate surface 102, creating a male joining section as depicted in the figure. Each panel 002 may further comprise a first planar surface forming a side 103 and a second planar surface forming a side 105. In an embodiment, panels of invention 002 may comprise supporting material, such as foam, 110 that has been covered with a fabric saturated with resin which has been cured by any curing means known in the art.

Referring now to FIG. 3a, a cross sectional view of two foam panels 002a and 002b of an embodiment of the invention are depicted nested together, depicting the C joint 001 of the invention in cross-section and providing further details of the C joint of the invention into breakout detail views B and C, in which an arcuate convex surface 102 of a first edge of a first panel 002b is joined to an arcuate concave surface 101 of a first edge of a second panel 002b, forming a structural nested joint between panels 002a and 002b, are depicted; also shown is the advantage of the present invention in reducing or eliminating print through depressions.

Still referring to FIG. 3a, two or more structural panels 002 of the invention, which may be fabricated as herein described, may comprise a supporting material such as a foam 110 covered with fabric 111, forming structural panels that are brought together as shown in the figure. Each structural panel 002a and 002b may comprise a first planar surface 103a and 103b, respectively, and a second planar surface 105a and 105b, respectively separated by a thickness T. Thickness T may be selected to be of a dimension that is appropriate to bear the anticipated structural loads, provide a desired thermal resistance, or may be selected to be of a dimension specifically adapted to a particular purpose identified by a user. When a plurality of structural panels of the invention 002 are brought together and assembled using the nested C joint of the invention as depicted in the figure to form a planar, the plurality of surfaces 103a, 103b and so on may be substantially aligned so as to form a resulting fifth planar surface 104; likewise, the plurality of surfaces 105a, 105b and so on may be substantially aligned so as to form a resulting sixth planar surface 106. The resulting planar surfaces 104 and 106 of the panel assembly may be further overlaid by fabric layer 107. The arcuate concave surfaces 101 and arcuate convex surfaces 102 comprising edges of structural panels 002 nest together as hereinbefore described.

Still referring to FIG. 3a, detail B depicts an expanded view of a portion of an embodiment of the C joint of the invention. A first panel 002a and second panel 002b have been assembled together as hereinbefore described. Arcuate concave surface 101 and arcuate convex surface 102 may be in substantial contact forming a nested C joint. The panels comprise supporting material 110 and are covered by fabric 111, with an overlaying fabric layer or layers 107. Likewise, detail C depicts an expanded view of a portion of the C joint of the invention on the opposite side of the panel C-joint. A first panel 002a and second panel 002b have been assembled together as hereinbefore described. Arcuate concave surface 101 and arcuate convex surface 102 may be in substantial contact forming a nested joint, and may be bonded together using an epoxy or other chemical bonding agent is desired by the user for particular application. The panels comprise supporting material 110 and are covered by fabric 111, with an overlaying fabric layer or layers 107.

Still referring to FIG. 3a, the joining of surfaces 101 and 102 between two panels 002a and 002b using the C joint configuration of the invention depicted in Details B and C may form a continuous nested C joint running the length of one edge of the joined panels. In this manner, a plurality of panels may be joined together having nested C joints running the length of the panels between them, thereby forming a planar structure having planar surfaces on either side. The resulting planar structure may be a flat or curved planar structure. Such panel assemblies may be utilized in numerous and varied structural and other applications including but not limited to, for example and not by way of limitation, wall assemblies suitable for constructing thermally insulated containers and the like.

Figure 4:
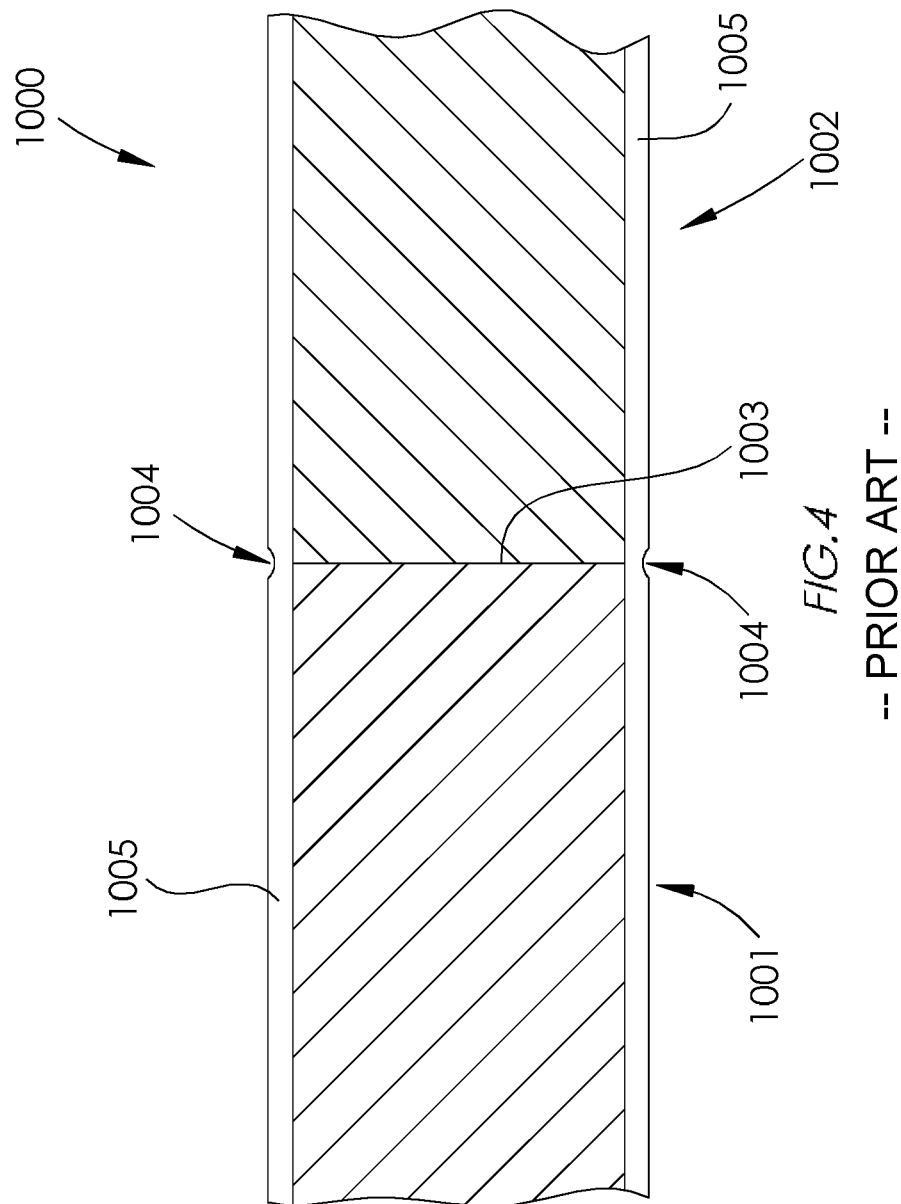
FIG. 4 depicts a cross section view of a butt joint of the prior art used in joining panels, and further depicting a disadvantage of the prior art in which print through depressions are formed by shrinkage of the resin during curing.

Still referring to FIG. 3a detail views B and C, and also to FIG. 4, a further advantage of the C-joint of the present invention is illustrated. It is a known feature in the art of structural composite fabrication that when composite panels are brought together using a butt joint to form a prior art panel assembly 1000 such as depicted in FIG. 4, a phenomenon known as "print through" depicted as feature 1004 in FIG. 4 may occur during the wetting and subsequent resin curing processes of the panel assembly. Print through 1004 manifests as a depression in the outer surface of a panel of the prior art, said depression 1004 running the length of butt joint 1003. Thus, when two butt joint panels 1001 and 1002 of the prior art are brought together and overlaid with fabric 1005 then subsequently wetted with resin and cured, an unsightly print through 1004 depression occurs running the length of butt joint 1003 due to resin shrinkage during curing process, and the fact that, at the point of contact between the butt joined panels, the butt joint supporting material does not uniformly support the resin as it is cured. This is a significant disadvantage of the prior art. In contrast, referring again to FIG. 3a detail views B and C, print through 120 in the present invention is significantly reduced or eliminated altogether in the finished multi-panel planar structure, i.e., dimension 121 is minimized or even brought to zero. This is due to the fact that the arcuate services and their fabric overlay meant operate to evenly distribute the forces resulting from the wetting and resin curing process due to the geometry of the C-joint, and the C joint forms a supporting surface under the fabric layers at 450, helping to prevent print through. This is another significant advantage of the present invention over prior art attempts to fabricate multi-panel wall structures using structural composite materials as print through is a highly undesirable feature in many applications, for cosmetic and other reasons.

Referring now to FIG. 3b, an alternate embodiment of the C joint is depicted in cross section. Two structural panels 002a and 002b of the invention are shown fitted together, depicting the alternative C joint of the invention in cross-section and providing further details of the C joint of the invention into breakout detail views, in which an arcuate convex surface of an edge of a first structural composite panel is joined to an arcuate concave surface of an edge of a second structural composite panel, and wherein convex surface step surfaces are joined to concave surface step surfaces, forming a fitted joint between a first structural composite panel 002a of the invention and a second structural composite panel 002b of the invention.

Still referring to FIG. 3a, two or more structural panels 002 of the invention, which may be fabricated as herein described, may comprise a supporting material such as a foam 110 covered with fabric 111, forming structural panels that are brought together as shown in the figure. Each structural panel 002a and 002b may comprise a first planar surface 103a and 103b, respectively, and a second planar surface 105a and 105b, respectively separated by a thickness T. Thickness T may be selected to be of a dimension that is appropriate to bear the anticipated structural loads, provide a desired thermal resistance, or may be selected to be of a dimension specifically adapted to a particular purpose identified by a user. When a plurality of structural panels of the invention 002 are brought together and assembled using the nested C joint of the invention as depicted in the figure to form a planar, the plurality of surfaces 103a, 103b and so on may be substantially aligned so as to form a resulting fifth planar surface 104; likewise, the plurality of surfaces 105a, 105b and so on may be substantially aligned so as to form a resulting sixth planar surface 106. The resulting planar surfaces 104 and 106 of the panel assembly may be further overlaid by fabric layer 107. The arcuate concave surfaces 101 and arcuate convex surfaces 102 comprising edges of structural panels 002a and 102b nest together as hereinbefore described.

Still referring to FIG. 3b, detail D depicts an expanded view of a portion of the C joint of the invention is depicted. A first panel 002a and second panel 00b2 have been assembled together as hereinbefore described. Arcuate concave surface 101 and arcuate convex surface 102 may be in substantial contact. The panels comprise a supporting material foam 110 and are covered by fabric 111, with an overlaying fabric 107. Convex surface step surface 132 is adapted to receive concave surface subsurface 133. Convex surface step surface 132 may be substantially in contact with concave surface 133. Step 130 formed by convex surface to surface 132 and concave surface step surface 133 may be of dimension 131. Likewise, detail E depicts an expanded view of a portion of the C joint of the invention on the opposite side of the panel joint is depicted in detail D. A first panel 002 and second panel 002 have been assembled together as hereinbefore described. Arcuate concave surface 101 and arcuate convex surface 102 may be in substantial contact, and may be bonded together using an epoxy or other chemical bonding agent is desired by the user for particular application. The panels may be of any material but, in a preferred embodiment, may comprise structural from 110 are covered by fabric 111, with an overlaying fabric 107. Convex surface step surface 132 is adapted to receive concave surface subsurface 133. Convex surface step surface 132 may be substantially in contact with concave surface 133 and these two surfaces may be bonded together using epoxy or other chemical bonding agents as may be desired by the user. Step 130 formed by convex surface to surface 132 and concave surface step surface 133 may be of dimension 131, which may be any dimension but may be, for example, a dimension equal to one later of fabric saturated with resin.

Still referring to FIG. 3b, the joining of surfaces between two panels 002 using the alternative C joint embodiment of the invention depicted in Details D and E, when brought together, may form a continuous nested joint running the length of one edge of the joint panels. In this manner, a plurality of panels may be joined together having nested joints running the length of the panels between them, thereby forming a resulting planar structure having resulting planar surfaces on either side. Such panel assemblies may be utilized in numerous and varied structural and other applications including but not limited to, for example and not by way of limitation, wall assemblies suitable for constructing thermally insulated containers and the like.

Figure 5A:
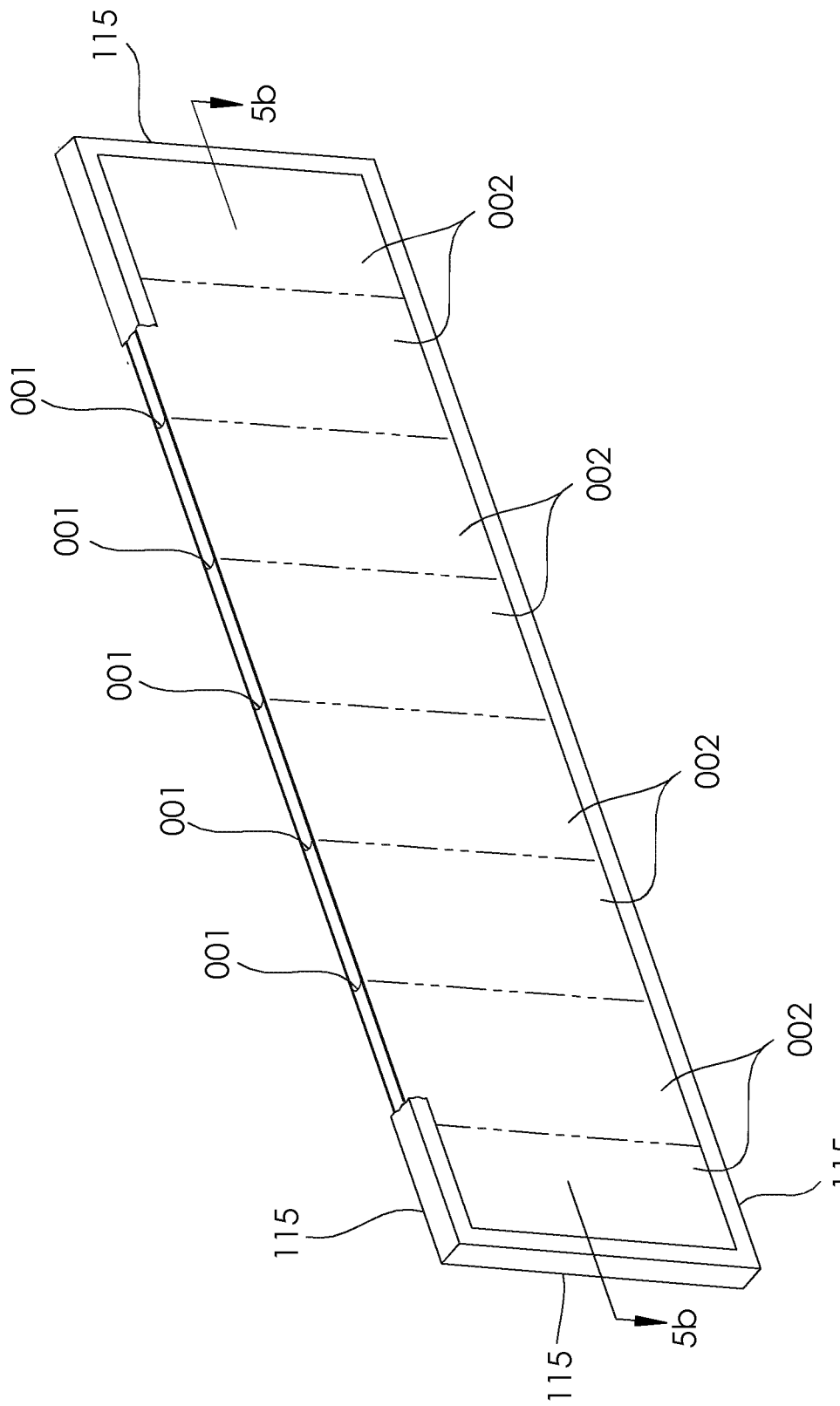
FIG. 5a depicts a perspective view of an embodiment of the planar structure of the invention in which a series of panels have been assembled together utilizing the nested C joint of the invention, forming a contiguous planar structure which may be utilized, for example, in the fabrication of thermally insulating containers, floor panels, wall, roofs or other structures.

Referring now to FIG. 5a, a perspective view of an embodiment of the invention in which a series of panels have been assembled together utilizing the C joint of the invention, forming a resulting planar structure which may be utilized, for example, in the fabrication of thermally insulating containers or other structures, is depicted. The resulting planar structure may be curved or flat. For simplicity sake, a flat structure is depicted in FIG. 5a. A plurality, which may be any number, of panels 002 of the invention are joined together using nested C joints 001 of the invention between them as hereinbefore described to form a planar structure having a first planar surface and a second planar surface and, in the non-limiting example in which the resulting planar structure is a flat planar structure, forming a wall like configuration. The plurality of panels 002 may be further overlaid by fabric layer or layers, and all the fabric panels and overlay fabric may be wedded with resin and the resin subsequently cured at the same time. Thus, in this manner, a series of panels 002 are brought together to form a planar structure. The dimensions of the final structure may take any dimensions as may be desired by the user for a particular application, likewise, the thickness of panels 002 may take any dimension as may be desired by a user for a particular application. The plurality of panels 002 may be received by and bonded to a frame 115 that may be any shape adapted to receive panels 002, but in a non-limiting example may be of U-shaped cross-section as is further depicted in FIG. 5B. In this matter a planar structure may be manufactured, and the resulting planar structure may be useful for assembly into numerous and varied structural applications such as, for example and not by way of limitation, construction of shipping containers, especially thermally insulated structural shipping containers that may be used in intermodal shipping.

Still referring to FIG. 5a, an exemplary planar structure may be fabricated using the following process. In a first step, a plurality of panels 002 are fabricated as described above. In a second step, frame 115 is fabricated by any means known in the art. In a third step, the panels may then be assembled into frame 115. In a fourth step, fabric layer or layers 107 may be then be laid over or wrapped around un-wetted panels 002. In a fifth step, the fabric layers may then be wetted with resin and the entire assembly may be vacuum bagged while the resin cures, producing a finished planar structure that is bonded to frame 115. Alternatively, panels 002 may be wetted with resin and cured prior to being assembled together. In this alternative method, panels 002 that have been wetted with resin and cured are assembled together in the third step, and the process continues with the fourth step of applying fabric layer 107 laid over or over wrapping wetted and cured panels 002, and in the fifth step fabric layer 107 may be wetted with resin and cured while the wall assembly is vacuum bagged.

Figure 5B:
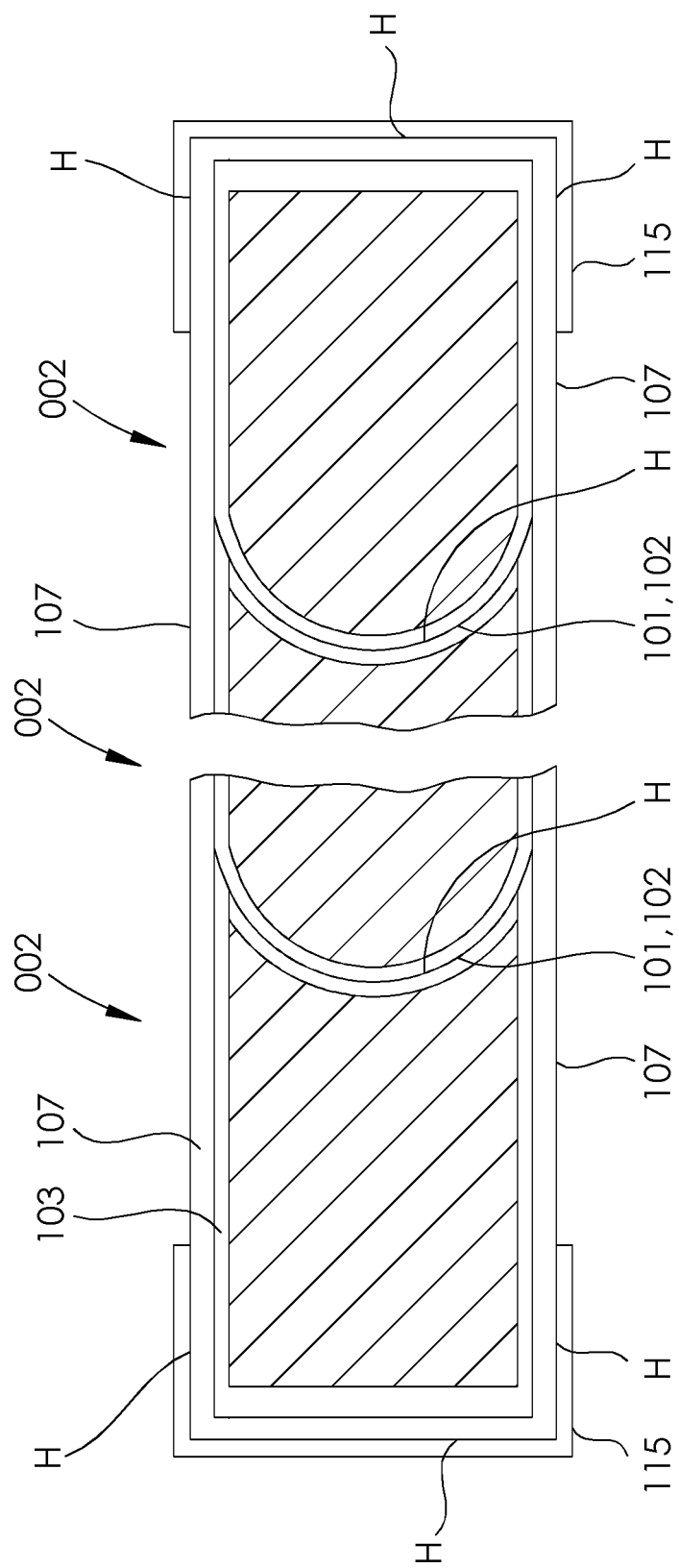
FIG. 5b depicts a cross-sectional view of an embodiment of the invention comprising a plurality of an embodiment of panels of the invention, showing a surrounding frame and structural panels in cross-section and further depicting the bonding surfaces that may be utilized to apply chemical bonding in order to attach the structural panels of the invention to the surrounding frame.

Referring now to FIG. 5b, a cross-section of the multi-panel wall assembly depicted in FIG. 5a is shown. A plurality of panels 002 have been brought together, as depicted in FIG. 5a, said panels being joined by nested C joints of the invention. Thus, arcuate concave surfaces 101 are in substantial contact with, arcuate convex surfaces 102. Panels 002 are overlaid by fabric 107. The resulting planar structure is received by channels 115, and the edge of the wall assembly that is in contact with the interior surfaces of channels 115 may comprise any joint such as, for example, a butt joint as depicted in the figure. The interior surfaces of channels 115 may be bonded to the outer surfaces of the resulting planar structure in the areas designated as H by any chemical bonding means known in the art such as, for example and not by way of limitation, epoxy or resin. Alternatively, the resulting planar structure may be bonded to frame 115 during wet-out and cure of the resin saturating the fabric layers. Frame 115 may comprise metal such as aluminum, steel or any other metal that has been joined together forming a frame such as that depicted in FIG. 5a. In an embodiment of the invention, frame 115 may comprise joints that are joined by mitering, welding of the miter joints. The resulting weld joints may be subsequently ground so that an aesthetically pleasing frame is produced. Alternatively, frame 115 may comprise fiberglass that has been shaped in a U-section as depicted in the drawing, or in any other shape that is adapted to receive panels 002. In the exemplary embodiment of the invention depicted in FIG. 5a the resulting planar structure is substantially rectangular in outline; however, the geometric shape of the resulting planar structure is not to be limited to rectangular shapes that may be in a shape as desired by a user for a particular application. Thus all planar structure outlines are within the scope of the invention.

Figure 6:
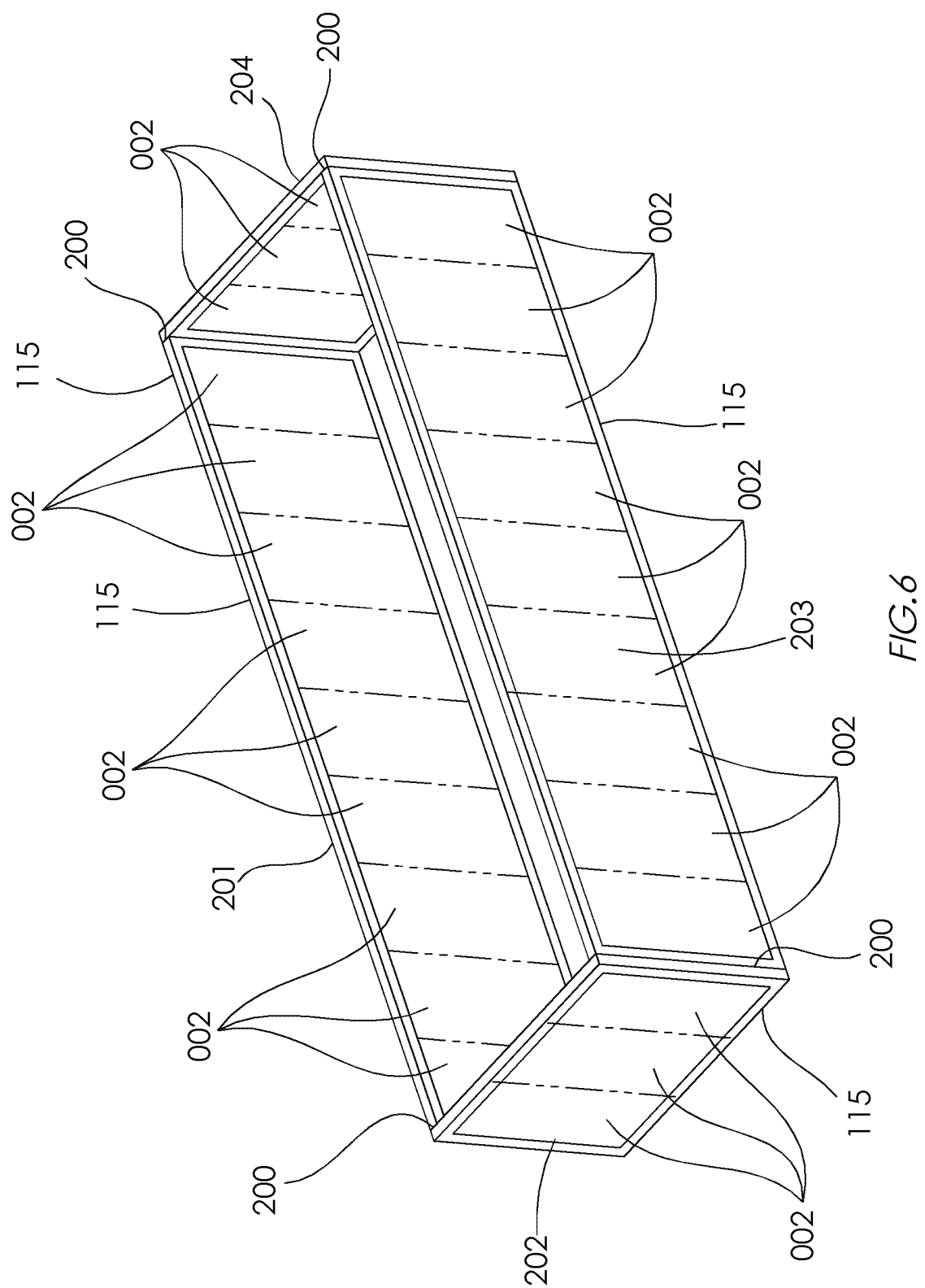
FIG. 6 depicts a perspective view of an embodiment of the invention in which a plurality of planar structures of the invention have been assembled together utilizing the nesting C joint of the invention, forming a multi-sided sided structure forming an enclosure which may be utilized, for example, in the fabrication of thermally insulated containers or other structures for use in numerous applications.

Referring now to FIG. 6, a perspective view of an embodiment of the invention in which a plurality of panels have been assembled together utilizing the nested C joint of the invention, forming a four sided structure, such as an enclosure, which may be utilized, for example, in the fabrication of thermally insulated containers for shipping, is depicted. The embodiment of the invention depicted in FIG. 6 is exemplary; any number of possible configurations of the invention utilizing resulting flat or cured planar structures are within the scope of the invention. The four sided exemplary structure depicted in FIG. 6 comprises a first side 201, a second side 202 a third side 203, and a fourth side 204. Each side comprises multiple panels 002 of the invention that have been brought together as hereinbefore described, forming substantially wall shaped structures as depicted in FIGS. 5A and 5B. Panels 002 may comprise frames 115. Sides 201, 202, 203 and 204 are assembled together forming a substantially rectangular box shape as depicted in the figure. Sides 201, 200, 203, and 204 may be joined together at joints 200 using any means known in the art including but not limited to threaded fasteners, rivets, chemical bonding, welding, and any other form of mechanical assembly known in the mechanical arts. In this manner, a container such as a thermally insulating shipping container may be constructed that exhibits all the superior features of the novel elements of the invention, namely, superior thermal insulation, lightweight, lower cost of manufacturing, resistance to structural loads, resistance to corrosion, and other advantageous features.

Figure 7:
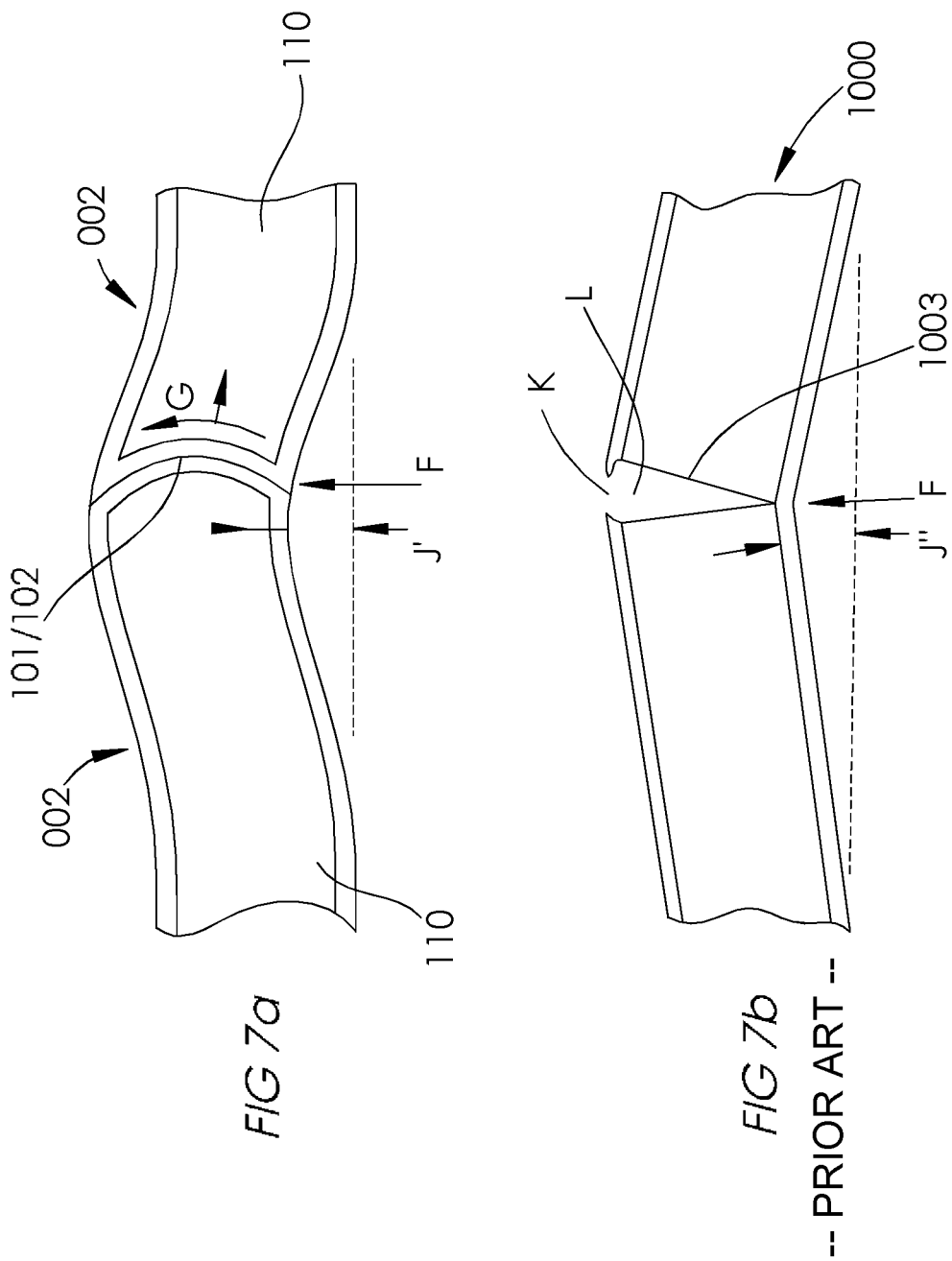
FIG. 7a depicts a schematic cross sectional view of a C joint of the present invention for purposes of comparison to the butt joint of the prior art, and describing the advantages of the present invention in providing increased resistance to applied loads, increased reliability and ability of the C joint of the present invention to return to its original shape after an impact, and to depict thermally superior properties of the C joint of the present invention.
FIG. 7b depicts a schematic cross sectional view butt joint of the prior art for the purposes of demonstrating the inferior load bearing performance of prior art.

The advantage of a C-joint of the present invention over a butt joint of the prior art is further shown in FIGS. 7a and 7b. FIG. 7a depicts a cross section view of a panel of the invention subjected to a load F, depicting an exemplary deflection of the panel and the resulting transfer of load along the C-joint without structural failure of the joint or panel, demonstrating an advantage of the panel and C-joint of the invention. FIG. 7b depicts, for comparison purposes to the nested C joint of the invention, a cross section view of a prior art C panel comprised of a butt joint subjected to a load F, depicting an exemplary deflection of the panel and the resulting failure of the prior art butt joint. As depicted in FIG. 7a, a load F acting on a C-joint of the invention may result in a deflection J'. When load F is applied to the C-joint the load is distributed around and along arcuate surfaces 101 and 102 as shown by arrow G and thus some of the transverse loading is redirected longitudinally into the foam material, where it is absorbed. The nested arcuate surfaces covered with fabric, wetted with resin and cured, create a "spring" like structure within the C joint that is able to flex in the direction of arrow I, thus acting to absorb applied loads with failure. This is because, among other things, the 90° joint stress riser of the prior art butt joint is eliminated. The result is reduced shear forces in the nested C joint between the two joined panels, a more resilient structure, and a higher loading capacity that the butt joints of the prior art. This is a distinct advantage of the nested C-joint of the invention over a prior art butt joint as depicted in FIG. 7c, in which it is clearly seen that application of load F to the butt joint causing deflection J" results in separation of the panel edges L at the butt joint 1003, which may cause a rupture of the fabric layer at K, resulting in structural failure of the prior art butt joint panel. Thus the nested C joint of the present invention exhibits superior load bearing qualities over the butt joints of the prior art. Still further, the same paths as described above and depicted in FIGS. 7A and 7B are applicable to thermal conductivity of the nested C joint. Thus, the thermal path through the C-joint is longer than the thermal path through a butt joint due to the arcuate shape joining the panels of the present invention: the arcuate shape results in a longer thermal conduction path and thus in increased thermal resistance from one side of the C joint to the other side. This is in contrast to the butt joint depicted in FIG. 7A which has a direct linear thermal path and is therefore less thermally resistive than the C-joint of the present invention. It can thus be seen that the C-joint of the present invention provides superior structural loadbearing and thermal insulating properties of the structures of the prior art.

Figure 8:
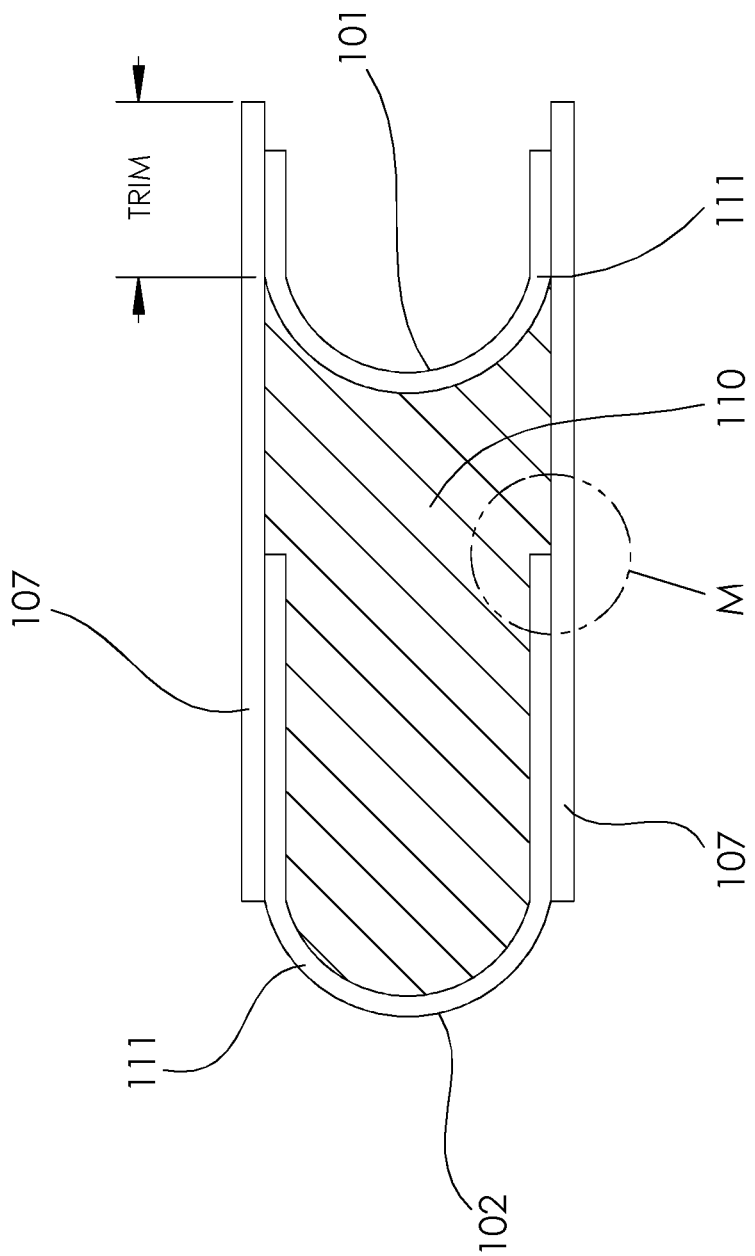
FIG. 8 depicts a cross section view of an embodiment of a panel of the present invention.

Referring now to FIG. 8, a particular, non-limiting exemplary embodiment of the C-joint of the present invention is depicted. The particular embodiment of the C-joint of the invention comprises outer fabric layers 107, which form first planar surface 103 and second planar surface 105. Fabric layers 111 cover structural material 110 as described herein. During fabrication, fabric layer 111 does not necessarily need to extend across the entirety of supporting material 110. Fabric layer 111 may terminate at point M underneath fabric layer 107. During the fabrication process, a "tail" of fabric extending beyond the terminus of supporting material 110 may occur. This tail may be trimmed to a desired dimension designated as TRIM in the figure such that the concave arcuate surface 101 is adapted to receive the convex arcuate surface 102 of an adjoining panel without interference.

Any embodiment of the invention may comprise structural plates, brackets or other structures for bearing loads, attachment to other structures, or the like. These structures may be embedded in panels or planar structures of the invention by placing or bonding them in place at a desired location prior to or after wetting out the fabric and curing the resin.

The dimensions of the invention may take on any value as desired by a user, and thus the C-joint radius, panel thickness, length of overlap of fabric layers, panel width separation between structural plates and all other dimensions may be of any measure desired.

In the embodiments of the invention in which panels 002 comprise foam material that has been covered with a fabric saturated with resin, the fabric layers may comprise a single layer of fabric or a plurality of layers comprising either woven fabric, non-woven fabric, or a combination of woven and non-woven fabric.

The fabric layers as set forth herein may comprise one or more individual fabric layers, and each layer need not be continuous. In the case where multiple layers of fabrics are utilized, it is not necessary that each type of fabric comprising a fabric layer be of the same type or weight. In a preferred embodiment of the invention, fabric layer 111 may be two ounce per square foot fabric. Further, in a preferred embodiment of the invention, overlaying fabric layer 107 may be twelve, twenty-four or thirty-six ounce per square yard fabric oriented at 45° to the sides of structural panel 002, the structural panel being substantially rectangular in shape. However, the type of fabric utilized in fabric layers 111 and 107 may be any type of fabric, may be of any orientation, may be backed or unbacked, and may be of any weight as may be selected by a user for particular structural application. Further, in a preferred embodiment, panels of the invention 002 may be placed on twelve to twenty-four inch centers when utilized to construct a wall structure as is depicted, for example, in FIG. 5a. It is to be understood however that wall panels 002 of the invention may be of such dimension that they may be placed on any desired center spacing, that they are not necessarily of rectangular shape and that the scope of the invention is not limited to the specific configuration of panel as depicted in the figures as the embodiments depicted in the figures are exemplary only. Likewise, for a preferred embodiment of the invention, thickness T may be in the range of one to four inches; but thickness T may take any dimension desired by a user for a particular application.

Method of Manufacturing

Panels and planar structures comprising the C joint of the invention may be fabricated by any manufacturing technique, including those identified herein, such as open molding, close molding injection in which resin is pumped into a closed mold under pressure for wetting the fabric, open hand lay-up, closed mold infusion in which the pressure is reduced in the mold pulling resin into the mold for wetting the fabric, resin transfer molding, vacuum assisted resin transfer molding, cold press, wet vacuum bagging and variations of these processes.

Referring now to FIG. 9a, the steps, generally, of manufacturing a planar structure of the invention include providing a supporting material and fabric 600; creating a plurality of panels 002, or 002a and 002b, as depicted in FIGS. 1a, 1b, 2, 3a and 3b, each panel comprising the C joints of the invention wherein each panel of said plurality of panels comprises a first planar surface, a second planar surface, a first edge, and a second edge, each of said first planar surface, second planar surface, said first edge and said second edge covered with at least one layer of fabric covering a supporting material such as foam, 601. In a next step 602 the plurality of panels are assembled together using any of the techniques described here, or as may be known in the art, forming a resulting planar structure comprised of adjoining panels joined together at a nested joint in which the convex arcuate surface of one panel of said plurality of panels is nested into the concave arcuate surface of an adjoining panel of said plurality of panels, said resulting planar structure having a resulting first planar surface and a resulting second planar surface. In a next step 603, each of the fabric layers are wetted with a resin. In a next step 604 the resin is cured, forming a resulting planar structure 605.

The panels 002 may be created as a preform. Referring to FIG. 9b, the same steps of the general method of manufacture are depicted as described above regarding FIG. 9a, except the steps assembling 602 and wetting 603 are reversed. Thus the fabric layers may be wetted prior to, or after, placing the panels together. After the panels are placed together and the fabric is wetted with resin, the resin is cured, forming a completed planar structure comprised of one or more panels. Various techniques for carrying out these steps of manufacture are described herein. The method steps of FIGS. 9a and 9b are exemplary, and not limiting.

Preforms for panels of the invention may be fabricated using the method for manufacturing structural pre-forms taught and described in U.S. Pat. No. 6,543,469, SYSTEM FOR CONTINUOUSLY MANUFACTURING A COMPOSITE PREFORM to Lewit et al., ("the '469 patent"), or a pre-formed structural composite structure formed by the method disclosed and taught in U.S. Pat. No. 5,897,818, METHOD FOR CONTINUOUSLY MANUFACTURING A COMPOSITE PREFORM to Lewit et al., ("the '818 patent"). Preforms may be manufactured using these methods in a continuous feed that may operate speeds of 16 feet per minute (fpm or ft/min) or greater, both of which are hereby incorporated by reference in their entirety.

Preforms for panels of the invention 002 may also be fabricated using a mold. A mold comprising a desired shape of the panel may be provided, and the interior surfaces of the mold may be covered with a desired fabric or plurality of fabric materials. Expanding foam may then be applied into the mold such that it penetrates the interstices of the fabric; the mold may be closed while the foam expands and/or cures; and then the structural preform may be removed from the mold as taught in U.S. Pat. No. 6,013,213 to Lewit et al. METHOD FOR MAKING DEFORMABLE COMPOSITE STRUCTURES AND ASSEMBLING COMPOSITE ARTICLE ("the '213 patent"), and also in U.S. Pat. No. 5,429,066 COMPOSITE STRUCTURES AND METHOD OF MAKING COMPOSITE STRUCTURES (the '066 patent). Alternatively, the mold may be closed prior to injecting the foam, and the foam may then be injected into the interior of the mold though an opening in the mold wall or a mechanical fitting capable of allowing the passage of foam into the mold, again as taught in the '213 patent. After the expanding foam has cured the fabric may be saturated with resin and cured.

In still a further alternate embodiment of manufacturing performs for panels of the invention 002, a panel 002 may be created by arranging a fabric or layers of fabric in a configuration constrained against outward movement and defining a cavity between opposing surfaces of the fabric or fabric layers; dispensing a predetermined amount of an expanding, self-curable, uncured foam into the cavity, the foam expanding and curing in the cavity at a molding pressure determined by the predetermined amount of the foam and thereby attaching itself to the fabric layer to form the composite structure, the molding pressure causing the expanding foam to substantially fill only interstices of an inner portion of the fabric layer, without substantially penetrating an outer portion of the fabric layer; and, freeing the cured composite structure from the constraint of the arranging step, the outer portion of the fabric layer of the composite structure being thereafter substantially completely saturable with a curable material for lamination to another structure in a subsequent processing step. This alternate method for creating a structural preform is taught in U.S. Pat. No. 5,908,591 METHOD FOR MAKING COMPOSITE STRUCTURES to Lewit et al.

A method of manufacturing panels of the invention 002 may comprise the above steps for creating a panel 002 covered with a fabric or fabrics, which may then be followed by followed by a wet-out step, in which resin is applied to the structural preform in order to saturate the fabric with resin. In this step, resin may be applied to the fabric covering the composite preform by any means known in the art including but not limited to spraying, brushing, by applying resin through channels and orifices in a mechanical wetting die such that the resin is applied to the fabric covering the structural preform, or by another means known for applying resin to a structural preform.

After a panel of the invention 002 is formed, and saturated with resin, and assembled with other panels by nested C joints to form a planar structure, a cure step may follow, in which the applied resin is cured, or at least partially cured. In this cure step, the resin may be cured by application of heat, such as is the case, for example, when a thermoset resin is utilized, by ultraviolet or other frequency of light such as is the case, for example, when light-curable resin is utilized, by ionizing radiation such as electron beam radiation, or by any other means known in the art for the curing of resin.

The technique known as vacuum bagging may be utilized to fully saturate the fabric and cure the resin saturating the fabric of a plurality of panels that have been assembled to form a planar structure. In this embodiment of the method of the invention, a plurality of panels are brought together, the concave surfaces and convex surfaces forming a nested C joint, or plurality of nested C joints, between adjoining panels as taught herein. Preforms for panels 002 may be wetted out prior to assembly by hand spraying or by any of the methods for wetting a structural composite fabric-covered foam preform as taught in United States printed patent publication number US2014-0262011 A1, titled STRUCTURAL COMPOSITE PREFORM WET-OUT AND CURING SYSTEM AND METHOD, published by the USPTO on Sep. 18, 2014. Alternatively, preforms for panels 002 may be wetted out by spraying or otherwise applying resin to the fabric layers of the panels by any means known in the art. After wetting, a vacuum bag may be placed over the wetted assembled panels, and pressure is then reduced inside the vacuum bag using a vacuum pump connected to the vacuum bag, removing air form inside the bag and forcing resin to fully saturate the fabric covering the panels. The resin is allowed to cure, resulting in a completed planar structure of the invention.

The techniques known as injection or infusion molding may be also be utilized to fully saturate and cure the resin saturating the fabric of a plurality of panels that have been assembled to form a planar structure. In this embodiment of the method of the invention, a plurality of panels are brought together, the concave surfaces and convex surfaces forming a nested C joint, or plurality of nested C joints, between adjoining panels as taught herein. Preforms for panels 002 may be wetted out prior to assembly by hand spraying or by any of the methods for wetting a structural composite fabric-covered foam preform as taught in United States printed patent publication number US2014-0262011 A1, titled STRUCTURAL COMPOSITE PREFORM WET-OUT AND CURING SYSTEM AND METHOD, published by the USPTO on Sep. 18, 2014. Panel preforms, either wetted, partially wetted, or unwetted, may be placed in a closed mold, and resin may then be injected into the mold under pressure for wetting the fabric layers, in an injection molding step. Likewise, panel preforms, either wetted, partially wetted, or unwetted, may be placed in a closed mold, and air may be evacuated from the mold using a vacuum pump while resin is introduced into the mold. The reduced pressure inside the mold pulls the resin into the fabric, wetting the fabric. In both infusion and injection molding the resin is cured after the fabric is fully wetted, resulting in a completed planar structure of the invention.

Planar structures comprising the C-joint of the invention may also be fabricated by any of the processes described in U.S. Pat. No. 9,371,468, titled CO-CURED GEL COATS, ELASTOMERIC COATINGS, STRUCTURAL LAYERS, AND IN-MOLD PROCESSES FOR THEIR USE, which issued from the USPTO on Jun. 21, 2016. For example, in the case in which the multi-panel planar structures of the invention are manufactured using the vacuum bagging, injection-molding, or infusing molding processes, gel coat and resin may be simultaneously cured using the methods taught in the '468 patent, resulting in reduced time for manufacture of a gel-coated, finished multi-panel planar structures.

While exemplary embodiments of the present invention have been described in the written description and depicted in the figures of the drawings, the present invention is not to be limited by the examples shown and is to be construed to comprise all equivalent embodiments. Specifically, for simplicity and brevity sake, rectangular panel shapes have been depicted in the figures of the drawings, but it is to be understood that the embodiments of the figures are exemplary only and that the panels of the invention may take any shape as desired, which may include arcuate surfaces, exterior shapes that are not wall like in nature and are not constrained before sided rectangular shapes as depicted in the figures, or in the other variation in shape or size, as such other shapes and configurations are construed to be within the scope of the present invention. The invention is not limited by the proportion between elements depicted in the drawings.

INDUSTRIAL APPLICABILITY

The panel joining system and method of the invention described and claimed comprises a structurally robust, mass producible, structural composite preform panel that further comprises features that enable accurate assembly, and of which a plurality may be assembled together to form a planar or other formed structural surface such as a wall, which may then be used to constructive a thermally insulative, structurally robust composite structure. The panels of the invention may be mass produced so that economies of scale are realized. The composite structure of the invention is also corrosion resistant and light weight.

Panels and panel assemblies comprising the panel joining system of the invention or produced by the method of the invention provide dramatic improvements in weight, durability, and thermal insulation over panels of the prior art that are commonly used in applications such as tractor trailer bodies. Such improvements allow for stronger, lighter weight freight containers, resulting in reduced fuel consumption, reduced carbon footprint for users of the invention, and lower fuel and transportation costs. Panels and panel assemblies comprising the panel joining system of the invention or produced by the method of the invention have also demonstrated an ability to absorb greater applied before experiencing structural failure than panels fabricated by materials and methods of the prior art, meaning that they have longer lifetimes and thus result in lower maintenance and replacement costs.

What is claimed is:

1. A joint for attaching adjacent panels, comprising:
a first preform panel having a first edge, a first planar surface, and a second planar surface, said first edge comprising a concave arcuate surface; and
a second preform panel having a second edge, a third planar surface, and a fourth planar surface, said second edge comprising a convex arcuate surface;
wherein said concave arcuate surface and said convex arcuate surface are complementary;
wherein said concave arcuate surface is adapted to receive said convex arcuate surface when said first edge of said first preform panel and said second edge of said second preform panel are brought together, said concave arcuate surface and said convex arcuate surface together forming a nested joint, and wherein said first planar surface and said third planar surface together form a resulting fifth planar surface, and said second planar surface and said fourth planar surface together form a resulting sixth planar surface; and
wherein said first preform panel and said second preform panel each comprise foam covered by a first fabric layer comprising at least one layer of fabric, such that said first edge, said first planar surface, and second planar surface of said first panel, and said second edge, said third planar surface, and said fourth planar surface of said second panel are each at least partially covered by said first fabric layer;
wherein the nested joint comprises at least two layers of fabric between the convex arcuate surface and the concave arcuate surface, at least one layer of said at least two layers formed of said first layer of fabric seamlessly covering said concave surface of said first preform, and at least one layer of said at least two layers formed of said first layer of fabric seamlessly covering said convex surface of said second preform;
and wherein said first fabric layer is wetted with a resin that is subsequently cured; such that the fabric layers within the nested joint, after they are wetted with a resin that is subsequently cured, form a spring-like structure within the nested joint that is able to flex in a direction transverse to the nested joint when a load is applied to said fifth surface or said sixth surface at the nested joint, the load being distributed along the arcuate surfaces, where a portion of the load is transferred to a direction transverse to the nested joint.

2. The joint of claim 1, wherein said concave arcuate surface and said convex arcuate surface are defined as a portion of a circular arc defined by a radius.

3. The joint of claim 1, wherein said resulting fifth planar surface and said sixth planar surface are each overlaid by a second fabric layer comprising at least one layer of fabric that is wetted with a resin that is subsequently cured.

4. The joint of claim 2, wherein said resulting fifth planar surface and said sixth planar surface are each overlaid by a second fabric layer comprising at least one layer of fabric that is wetted with a resin that is subsequently cured.

5. The joint of claim 1, wherein said foam is further defined to be polyurethane foam.

6. The joint of claim 1, wherein said first fabric layer comprises fibers selected from the group consisting of fiberglass, carbon fiber, and para-aramid synthetic fiber, and wherein said resin is selected from the group consisting of polymer resin, polyester resin, vinyl ester resin, polyurethane resin, epoxy, hybrid resin, and co-cured resin.

7. The joint of claim 3, wherein said first fabric layer and said second fabric layer are each individually comprised of fibers selected from the group consisting of fiberglass, carbon fiber, and para-aramid synthetic fiber, and wherein said resin is selected from the group consisting of polymer resin, polyester resin, vinyl ester resin, polyurethane resin, epoxy, hybrid resin, and co-cured resin.

8. A planar structure, comprising:
a plurality of adjoining preform panels, wherein each preform panel comprises a first planar surface, a second planar surface, a first edge, and a second edge, each of said first planar surface, second planar surface, said first edge and said second edge covered by a first fabric layer comprising at least one layer of fabric;
wherein said first edge of each of said plurality of preform panels is defined as comprising a concave arcuate surface; and
wherein said second edge of each of said plurality of preform panels is defined as comprising a convex arcuate surface; and
wherein said concave arcuate surfaces are complementary to said convex arcuate surfaces and wherein said concave arcuate surface is adapted to receive said convex arcuate surface when said first edge of said first preform panel and said second edge of said second preform panel are brought together, forming a nested joint between adjoining preform panels;
each panel of said plurality of panels attached to an adjoining panel by a nested joint;
said plurality of preform panels having a resulting third planar surface formed by the first planar surfaces of each of the plurality of preform panels, and having a resulting fourth planar surface formed by the second planar surfaces of each of the plurality of preform panels;
wherein the nested joint comprises at least two layers of fabric between the convex arcuate surface and the concave arcuate surface, at least one layer of said at least two layers formed of said first layer of fabric seamlessly covering said concave surface of said first preform, and at least one layer of said at least two layers formed of said first layer of fabric seamlessly covering said convex surface of said second preform;
wherein said first fabric layer is wetted with a resin that is subsequently cured;
such that the fabric layers within the nested joint, after they are wetted with a resin that is subsequently cured, form a spring-like structure within the nested joint that is able to flex in a direction transverse to the nested joint when a load is applied to said fifth surface or said sixth surface at the nested joint, the load being distributed along the arcuate surfaces, where a portion of the load is transferred to a direction transverse to the nested joint.

9. The planar structure of claim 8, wherein said concave arcuate surfaces and said convex arcuate surfaces are further defined as a portion of an arc defined by a radius.

10. The planar structure of claim 8, wherein said resulting third planar surface and said fourth planar surface are each overlaid with a second fabric layer comprising at least one layer of fabric that is wetted with a resin that is subsequently cured.

11. The planar structure of claim 8, wherein said foam is further defined to be polyurethane foam.

12. The planar structure of claim 8, wherein said first fabric layer is comprised of fibers selected from the group consisting of fiberglass, carbon fiber, and para-aramid synthetic fiber, and wherein said resin is selected from the group consisting of polymer resin, polyester resin, vinyl ester resin, polyurethane resin, epoxy, hybrid resin, and co-cured resin.

13. A method of fabricating a planar structure, comprising:
providing a plurality of preform panels, each preform panel comprising foam covered by a first fabric layer comprising a least one layer of fabric, wherein each preform panel of said plurality of panels comprises a first planar surface, a second planar surface, a first edge, and a second edge, each of said first planar surface, second planar surface, said first edge and said second edge covered by said first fabric layer;
wherein said first edge of each preform panel of said plurality of preform panels is defined as comprising a concave arcuate surface in cross section; and
wherein said second edge of each preform panel of said plurality of preform panels is defined as comprising a convex arcuate surface in cross section;
assembling plurality of preform panels together forming a resulting planar structure comprised of adjoining preform panels joined together at a nested joint in which the convex arcuate surface of one preform panel of said plurality of preform panels is nested into the concave arcuate surface of an adjoining preform panel of said plurality of preform panels, said resulting planar structure having a resulting first planar surface and a resulting second planar surface, wherein the nested joint comprises at least two layers of fabric between the convex arcuate surface and the concave arcuate surface, at least one layer of said at least two layers formed of said first layer of fabric seamlessly covering said concave surface of said first preform, and at least one layer of said at least two layers formed of said first layer of fabric seamlessly covering said convex surface of said second preform;
wetting said first fabric layer with a resin; and
curing said resin;
such that the fabric layers within the nested joint, after they are wetted with a resin that is subsequently cured, form a spring-like structure within the nested joint that is able to flex in a direction transverse to the nested joint when a load is applied to said fifth surface or said sixth surface at the nested joint, the load being distributed along the arcuate surfaces, where a portion of the load is transferred to a direction transverse to the nested joint.

14. The method of claim 13, wherein the step of assembling is further defined as including the step of applying a second fabric layer comprising at least one layer of fabric onto said resulting first planar surface, and applying at least one layer of fabric onto said resulting second surface.

15. The method of claim 13, wherein each of said preform panels is rectangular, and wherein said concave arcuate surface and said convex arcuate surface are disposed upon opposing edges.

16. The method of claim 14, wherein each of said preform panels is rectangular, and wherein said concave arcuate surface and said convex arcuate surface are disposed upon opposing edges.

17. The method of claim 13, wherein said foam is further defined to be polyurethane foam.

18. The method of claim 13, wherein said first fabric layer is comprised of fibers selected from the group consisting of fiberglass, carbon fiber, and para-aramid synthetic fiber, and wherein said resin is selected from the group consisting of polymer resin, polyester resin, vinyl ester resin, polyurethane resin, epoxy, hybrid resin, and co-cured resin.

19. The method of claim 13, wherein the step of assembling is further defined as enclosing said plurality of preform panels in a mold, and wherein the step of wetting is further defined as either injecting or infusing said resin into said mold.

20. The method of claim 13, wherein the step of assembling is further defined as enclosing said plurality of preform panels in a vacuum bag, and wherein the step of curing is further defined as including the step of reducing pressure inside the bag until the resin is cured.

* * * * *